United States Patent
Brown et al.

(10) Patent No.: US 12,162,202 B2
(45) Date of Patent: Dec. 10, 2024

(54) MOLDED CONTAINER INCORPORATING SURFACE INDICIA

(71) Applicant: DISCMA AG, Zürich (CH)

(72) Inventors: Jessica Brown, Ann Arbor, MI (US); Bradley Krzyzaniak, Manitou Beach, MI (US); Gregory Carpenter, Ann Arbor, MI (US); Mark Blystone, Adrian, MI (US)

(73) Assignee: Discma AG, Zurich (CH)

( * ) Notice: Subject to any disclaimer, the term of this patent is extended or adjusted under 35 U.S.C. 154(b) by 89 days.

(21) Appl. No.: 17/846,828

(22) Filed: Jun. 22, 2022

(65) Prior Publication Data
US 2022/0324153 A1    Oct. 13, 2022

Related U.S. Application Data

(62) Division of application No. 16/498,217, filed as application No. PCT/US2018/025721 on Apr. 2, 2018, now Pat. No. 11,370,158.

(Continued)

(51) Int. Cl.
*B29C 49/00* (2006.01)
*B29C 37/00* (2006.01)
(Continued)

(52) U.S. Cl.
CPC .......... *B29C 49/00* (2013.01); *B29C 37/0053* (2013.01); *B29C 49/12* (2013.01); *B29C 49/36* (2013.01); *B29C 49/46* (2013.01); *B29C 49/52* (2013.01); *B65D 1/0223* (2013.01); *B65D 1/40* (2013.01); *B29C 2049/4664* (2013.01); *B29K 2701/12* (2013.01); *B29L 2031/7158* (2013.01); *B65D 2203/00* (2013.01)

(58) Field of Classification Search
CPC .... B65D 2203/00; B65D 1/0223; B65D 1/40; B65D 2203/02; G09B 21/003; G09B 21/00; G09B 21/001; G09B 21/002
USPC .......... 206/459.1, 459.5, 534; 215/230, 286; 434/113
See application file for complete search history.

(56) References Cited

U.S. PATENT DOCUMENTS 4,883,180 A * 11/1989 Humphrey ................ G09F 3/00
                                                  206/534
5,011,032 A *  4/1991 Rollman .................... A61J 7/04
                                                  116/323
(Continued)

FOREIGN PATENT DOCUMENTS

EP       2143543 A1    1/2010
JP       H0247035 A    2/1990
(Continued)

*Primary Examiner* — Steven A. Reynolds
*Assistant Examiner* — Prince Pal
(74) *Attorney, Agent, or Firm* — Honigman LLP; Eric J. Sosenko; Jonathan P. O'Brien

(57) ABSTRACT

A molded container of plastic material. The molded container including a neck finish defining an opening into the molded container, a body extending from the neck finish and including a shoulder adjacent the neck finish, a base defining a closed end of the container, and a sidewall extending between the shoulder and the base. Formed on a surface of the container and being defined by the plastic material forming the container are a series of raised dots defining a tactile writing feature.

12 Claims, 30 Drawing Sheets

Related U.S. Application Data

(60) Provisional application No. 62/480,007, filed on Mar. 31, 2017.

(51) Int. Cl.

| | | |
|---|---|---|
| *B29C 49/12* | (2006.01) | |
| *B29C 49/36* | (2006.01) | |
| *B29C 49/46* | (2006.01) | |
| *B29C 49/52* | (2006.01) | |
| *B29K 701/12* | (2006.01) | |
| *B29L 31/00* | (2006.01) | |
| *B65D 1/02* | (2006.01) | |
| *B65D 1/40* | (2006.01) | |

(56) References Cited

U.S. PATENT DOCUMENTS

| | | | | |
|---|---|---|---|---|
| 5,251,758 A * | 10/1993 | Kolacek | ............... | B65D 51/247 428/905 |
| 5,649,480 A * | 7/1997 | Yim | ............... | B41M 7/0081 400/109.1 |
| 5,720,616 A * | 2/1998 | Schuler, III | ............... | G09B 21/003 29/525 |
| 5,820,016 A * | 10/1998 | Stropkay | ............... | B65D 47/06 220/592.16 |
| 6,089,180 A * | 7/2000 | Nichols, Jr. | ............... | G09F 11/23 215/230 |
| 6,227,371 B1 * | 5/2001 | Song | ............... | G09B 21/003 215/230 |
| 6,296,175 B1 * | 10/2001 | Dixon | ............... | B65D 5/685 229/102 |
| 7,207,467 B1 * | 4/2007 | Raja | ............... | A47G 19/24 222/142.2 |
| 7,252,204 B1 * | 8/2007 | Small | ............... | E05B 37/02 215/208 |
| 8,573,964 B2 * | 11/2013 | Andison | ............... | B29C 49/783 425/524 |
| 8,875,915 B2 * | 11/2014 | Serell | ............... | E05B 17/0004 220/254.1 |
| 9,789,641 B2 * | 10/2017 | Suyama | ............... | B29C 49/58 |
| 9,849,069 B1 * | 12/2017 | Khatri | ............... | B65D 83/0409 |
| 10,265,700 B2 * | 4/2019 | Messinger | ............... | B01L 3/54 |
| 10,752,396 B2 * | 8/2020 | Evans | ............... | B65D 1/44 |
| 10,870,504 B2 * | 12/2020 | Desoutter | ............... | B29C 49/4273 |
| 11,192,288 B2 * | 12/2021 | Shiokawa | ............... | B65B 3/12 |
| 11,370,158 B2 * | 6/2022 | Brown | ............... | B29C 49/12 |
| 11,636,780 B2 * | 4/2023 | Keller | ............... | G09B 21/003 434/113 |
| 2005/0023173 A1 * | 2/2005 | Paoletti | ............... | B65D 55/0854 215/230 |
| 2006/0043106 A1 * | 3/2006 | Pottish | ............... | B65D 35/44 222/92 |
| 2006/0118507 A1 * | 6/2006 | Feldman | ............... | B65D 23/0871 215/396 |
| 2008/0000927 A1 * | 1/2008 | Butler | ............... | B05B 11/0005 222/113 |
| 2010/0200449 A1 * | 8/2010 | Kasboske | ............... | G09F 3/00 108/50.11 |
| 2011/0303572 A1 * | 12/2011 | Rajpoot | ............... | B65D 1/265 206/459.5 |
| 2012/0043243 A1 * | 2/2012 | Selina | ............... | B65D 81/3876 206/459.5 |
| 2012/0193259 A1 * | 8/2012 | Bahrami | ............... | G09B 21/003 206/459.5 |
| 2012/0285366 A1 * | 11/2012 | Perez | ............... | B65D 25/205 116/278 |
| 2013/0056463 A1 * | 3/2013 | Buck | ............... | B65D 51/28 220/834 |
| 2013/0147097 A1 * | 6/2013 | Lane | ............... | B65D 1/0207 264/524 |
| 2013/0313147 A1 * | 11/2013 | Bahrami | ............... | B65D 23/00 206/459.5 |
| 2014/0001248 A1 * | 1/2014 | Wong | ............... | B65D 5/4208 229/116.1 |
| 2014/0332434 A1 * | 11/2014 | Regas | ............... | B65D 23/085 206/459.5 |
| 2015/0287343 A1 * | 10/2015 | Moore | ............... | B65D 77/02 206/459.5 |
| 2015/0336320 A1 * | 11/2015 | Poulat | ............... | B65D 1/0223 425/526 |
| 2016/0042670 A1 * | 2/2016 | Reid | ............... | G09F 3/10 40/638 |
| 2018/0273261 A1 * | 9/2018 | Qiu | ............... | B65D 1/02 |
| 2020/0361673 A1 * | 11/2020 | Knobel | ............... | B65D 25/10 |
| 2021/0101711 A1 * | 4/2021 | Brown | ............... | B29C 49/00 |
| 2021/0347102 A1 * | 11/2021 | Birbeck | ............... | B65D 1/0276 |

FOREIGN PATENT DOCUMENTS

| | | |
|---|---|---|
| JP | H07165225 A | 6/1995 |
| JP | 2010264723 A | 11/2010 |
| WO | 2008053112 A2 | 5/2008 |
| WO | 2015/015243 A1 | 2/2015 |

\* cited by examiner

MOLDED CONTAINER INCORPORATING SURFACE INDICIA

CROSS REFERENCE TO RELATED APPLICATION

This application is a divisional application of U.S. application Ser. No. 16/498,217, filed Sep. 26, 2019, which is the U.S. national stage of international application no. PCT/US2018/025721, filed Apr. 2, 2018, which claims the benefit of U.S. provisional application No. 62/480,007, filed Mar. 31, 2017, the entire contents of all of which are herein incorporated by reference.

BACKGROUND

1. Technical Field of the Invention

The present invention relates to molded containers, and more particularly to molded containers having tactile writing or other indicia molded into various portions of the container.

2. Related Technology

Plastic containers for liquids are manufactured by various different methods. In most methods, a plastic preform is heated to a suitable temperature for molding, placed within a mold and then expanded axially and radially to form the container. In certain processes, air is used as a blow molding medium to expand the preform.

The shoulders, sidewalls and base portions of such containers are often molded so as to present a design/indicia) that may be visually perceived by the end user. In some instances, the design/indicia is an aesthetic pleasing pattern to provide distinctiveness to the container. In other instances, the design/indicia may be a logo or trademark.

While the level of detail in the designs that can be molded into such container is acceptable for presenting large distinctive patterns and large logos, the level of detail is unacceptable for presenting smaller patterns and logos, and in particular for presenting smaller readable lettering or tactile writing, such a braille, as may be wanted to identify the contents of the container or provide other information to the end user. Currently, such information is provided in print or embossed form on the label of the container, but not the container itself.

In the field known as hydraulic blow molding, or sometimes liquid blow molding or hydroforming, it is known to inject a liquid under pressure inside a preform already placed in a mold to shape a container according to the cavity shape of the mold and fill the shaped container with the liquid at the same time. Advantageously, the injected liquid is the end product retained in the container, i.e. the product which is intended to be provided to a consumer using the container.

Hydraulic blow molding has several advantages compared to the conventional air blowing techniques. In the latter technique, the preform is formed into the container by first injecting a compressed gas, for example pressurized air, into the preform. The formed container is subsequently filled with the end product, either directly afterward by an adjacent filling machine and station or later after transporting the empty container to a filling facility. Obviously, one of the advantages of hydraulic blow molding is that the obtained container is simultaneously filled with the end product.

In hydraulic blow molding, the filled containers can be produced at a higher rate since the forming step of the container is not separated from the filling step. The energy cost of hydraulic blow molding is reduced since there is no need to produce the compressed gas used in air blow molding with air. Additionally, higher pressures can be imparted to the preform with an incompressible liquid instead of air, which is compressible. Such pressures allow one to obtain a container having a very satisfactory shape since the wall of the preform is urged against the wall of the mold in an optimal manner. U.S. Pat. No. 8,573,964 discloses a hydraulic blow molding technique, which is herein incorporated by reference in its entirety.

SUMMARY

In one aspect of the invention, a method of forming a container of plastic material is provided, the method comprising the steps of: providing a preform of the plastic material, the preform including an open end defined by a mouth, a closed end and a generally cylindrical body extending between the closed end and the mouth; placing the preform within a mold having surfaces defining a cavity corresponding in shape to the container; injecting an incompressible medium under pressure into the preform, the incompressible medium being an end product remaining in the molded container; expanding the preform in the cavity under the influence of the incompressible medium into contact with the surfaces defining the cavity and simultaneously forming and filling the container; during expanding of the preform, forcing portions of the plastic material into a series of recesses defined in the cavity surface, each of the recesses having a common depth; and removing the container with the incompressible medium contained therein from the mold, the container including a series of raised dots corresponding to the series of recesses defined in the cavity surface.

In another aspect, the recesses are provided in a portion of the cavity defining one of a shoulder or base of the container.

In a further aspect, the recesses are provided adjacent to a portion defining a sidewall of the container.

In additional aspect, the recesses and the raised dots define a depth to height ratio of less than 9:1.

In another aspect, the recesses and the raised dots define a depth to height ratio of less than 3:1.

In a further aspect, the recesses and the raised dots define a relief factor of greater than 0.11.

In an additional aspect, the recesses and the raised dots define a relief factor of greater than 0.3.

In another aspect, the incompressible medium is injected at a pressure of less than 40 bar.

In a further aspect, the incompressible medium is injected at a pressure of less than 36 bar.

In an additional aspect, the incompressible medium is injected at a pressure in the range of 30 to 35 bar.

In another aspect, the incompressible medium is injected with a peak pressure of less than 40 bar.

In a further aspect, the incompressible medium is injected with a peak pressure of less than 36 bar.

In an additional aspect, the incompressible medium is injected with a peak pressure in the range of 30 to 35 bar.

In another aspect, each of the raised dots extends from an immediately surrounding surface of the molded container to a nominal height of not less than 0.2 mm, more preferably greater than 0.25 mm and most preferably greater than 0.258 mm.

In a further aspect, the series of raised dots define a tactile writing feature.

In an additional aspect, the series of raised dots define a tactile writing feature comprised of a plurality of equidistantly spaced cells and each cell including a character formed by not more than six of the raised dots.

In another aspect, each of the raised dots has a nominal base diameter in the range of greater than 1.4 mm to less than 1.7 mm In a further aspect, the invention provides a molded container of plastic material, the molded container comprising: a neck defining an opening into the molded container; a body extending from the finish and including a shoulder adjacent the finish, a base defining a closed end of the container, and a sidewall extending between the shoulder and the base; and a series of raised dots defining tactile writing feature formed on a surface of the container and being defined by the plastic material forming the container.

In an additional aspect, the tactile writing feature is formed on at least one of the shoulder and the base.

In another aspect, the tactile writing feature is formed adjacent to the sidewall on at least one of the shoulder and the base.

In a further aspect, each of the raised dots extends from an immediately surrounding surface of the molded container to a nominal height of not less than 0.2 mm, more preferably greater than 0.25 mm and most preferably greater than 0.258 mm.

In an additional aspect, each of the raised dots extends from an immediately surrounding surface of the molded container to a nominal height of between 0.25 mm and 0.6 mm.

In another aspect, the raised dots has a nominal base diameter of not more than 1.69 mm.

In a further aspect, each of the raised dots has a nominal base diameter in the range of 1.4 mm to less than 1.7 mm and extends from an immediately surrounding surface of the molded container to a nominal height in the range of 0.25 mm to less than 0.9 mm.

In an additional aspect, the tactile writing feature is comprised of a plurality of equidistantly spaced cells and each cell including a character formed by not more than six of the raised dots.

In another aspect, a method of forming a molded container of plastic material is provided, the method comprising the steps of: providing a preform of the plastic material; placing the preform within a mold having cavity surfaces defining a cavity corresponding in shape to a desired shape of the container; injecting an incompressible medium under pressure into the preform, the incompressible medium being an end product remaining in the molded container; expanding the preform in the cavity under the influence of the incompressible medium into contact with the cavity surfaces and simultaneously forming and filling the molded container with a shape extending from a neck defining an opening into the molded to a base defining a closed end of the molded container; during expanding of the preform, forcing portions of the plastic material into recesses in the cavity surfaces that form part of a embossed texture on a surface of the container; and removing the container from the mold wherein the resulting embossed texture on the container has a roughness average $S_a$ that is at least 40% greater than the roughness average $S_a$ of the corresponding embossed texture of a container molded in the same mold using pressurized air.

In a further aspect, a molded container of plastic material is provided, the container comprising: a neck defining an opening into the molded container, a body extending from the neck and including a base defining a closed end of the molded container; embossed texture being formed on a surface of the plastic container and being defined by the plastic material forming the molded container, wherein the embossed texture has a roughness average $S_a$ that is at least 40% greater than the roughness average $S_a$ of the corresponding embossed texture of a container molded in the same mold using pressurized air.

In an additional aspect, the invention provides a molded container of plastic material is provided having a neck defining an opening into the molded container, a body extending from the neck and including a base defining a closed end of the molded container; a tactile writing being formed on a surface of the plastic container and being defined by the plastic material forming the molded container, the tactile writing being comprised of a plurality of equidistantly spaced cells; and each cell including a character formed by not more than six raised dots, wherein each of the raised dots has a nominal base diameter of not more than 0.063 inches and extends from an immediately surrounding surface of the molded container to a nominal height of not more than 0.037 inches.

In another aspect, each of the raised dots has a nominal base diameter of not more than 0.057 inches and extends from an immediately surrounding surface of the molded container to a nominal height of not more than 0.019 inches.

In another aspect of the invention, a method of forming a molded container of plastic material is provided and includes the steps of: providing a preform of the plastic material; placing the preform within a mold having cavity surfaces defining a cavity corresponding in shape to a desired shape of the container; injecting an incompressible medium under pressure into the preform, the incompressible medium being an end product remaining in the molded container; expanding the preform in the cavity under the influence of the incompressible medium into contact with the cavity surfaces and simultaneously forming and filling the molded container with a shape extending from a neck defining an opening into the molded to a base defining a closed end of the molded container; during expanding of the preform, forcing portions of the plastic material into recesses in the cavity surfaces and forming part of a tactile writing impression, the tactile writing impression being comprised of a plurality of equidistantly spaced cells, and each cell defining a character formed by six or less of the recesses, wherein each of the recesses has a nominal base diameter of not more 10% greater than 0.063 inches and is recessed from an immediately surrounding surface of the cavity surface to a nominal depth of not more than 10% greater than 0.037 inches; and removing the molded container with the incompressible medium contained therein from the mold.

In a further aspect, the method includes expanding of the preform, the plastic material is forced into the recesses and each of the recesses has a nominal base diameter of not more than 10% greater than 0.057 inches and is recessed from an immediately surrounding surface of the cavity surface to a nominal depth of not more than 10% greater than 0.019 inches.

In another aspect of the invention, a molded container of plastic material is provided having a neck finish defining an opening into the molded container, a body extending from the neck and including a base defining a closed end of the molded container; embossed features (design/indicia) being formed on a surface of the plastic container and being defined by the plastic material forming the molded container In a further aspect, the embossed features have a mean surface height profile not less than 80% and preferably not less than 85% of the depth of the corresponding depression feature defining the embossed feature and provided in the mold forming the container.

In another aspect of the invention, a method of forming a molded container of plastic material is provided and includes the steps of: providing a preform of the plastic material; placing the preform within a mold having cavity surfaces defining a cavity corresponding in shape to a desired shape of the container; injecting an incompressible medium under pressure into the preform, the incompressible medium being an end product remaining in the molded container; expanding the preform in the cavity under the influence of the incompressible medium into contact with the cavity surfaces and simultaneously forming and filling the molded container with a shape extending from a neck defining an opening into the molded to a base defining a closed end of the molded container; during expanding of the preform, forcing portions of the plastic material into recesses in the cavity surfaces and forming part of a embossed feature (design/indicia), the embossed feature.

Further objects, features and advantages of this invention will become readily apparent to persons skilled in the art after review of the following description, including the claims, and with reference to the drawings that are appended to and form a part of this specification.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

In the following description, the terms "upper" and "lower" are defined relative to an axis, axis A, which corresponds to the axis of the preform and the container to be produced and which extends generally vertically when the container is placed on its base. The terms "upstream" and "downstream" are defined relative to the direction in which the preforms and the containers circulate in the machine shown in FIG. 1. The term "liquid" has a physical meaning and encompasses any flowable, incompressible medium.

Figure 1:
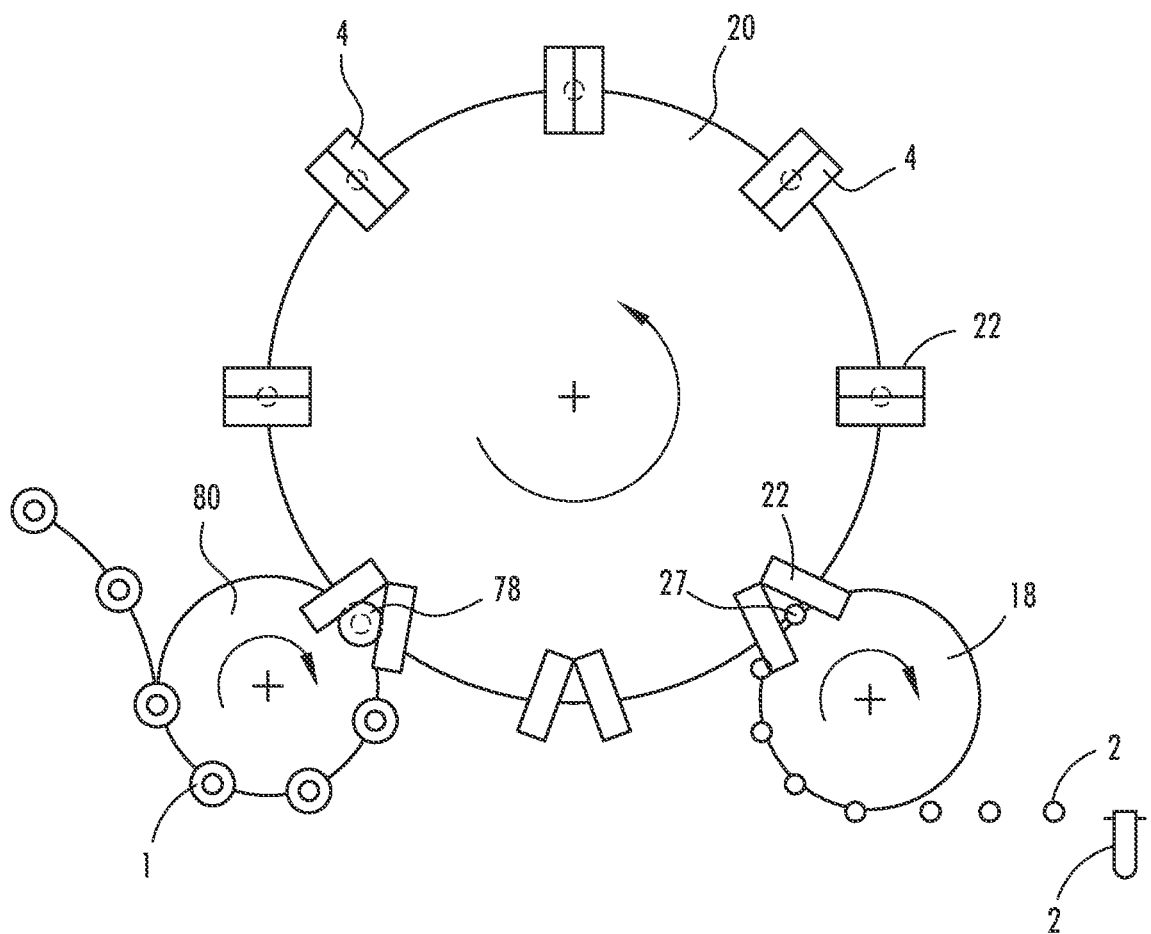
FIG. 1 is a schematic illustration of a machine for producing containers from preforms in accordance with the principles of the present invention.

Referring now to FIG. 1, an apparatus or machine for forming and filling a container 1 from a preform 2 is generally illustrated therein. In the machine, a forming and filling station 4, receives the preforms 2 and outputs a formed and filled containers 1. For simplicity and brevity, the term "forming and filling station 4" is hereafter simply referred to as "forming station 4."

The machine is arranged so that it receives successive preforms 2, each made of a thermoplastic material. The thermoplastic material is for example chosen among the polyesters, such as polyethylene terephthalate (PET), polyethylene naphthalene (PEN), polyethylene imine (PEI), polytrimethylene terephthalate (PTT), polylactic acid (PLA), polyethylene furanoate (PEF), or polyolefins, such as polyethylene low density (LDPE) or high density (HDPE), polypropylene (PP), or styrene based materials such as polystyrene (PS), or other polymers, such as polyvinyl chloride (PVC) or a mix of these materials.

Each preform 2 has the general shape of a test tube. More specifically, each preform 2 comprises a body 8 having the shape of a tube or cylinder extending along axis A. The preforms 2 are formed at one end with an open end 10 and at the other end with a closed end 12. The open end 10 is may be provided with the final shape of the neck or finish 14 of the container, meaning that the shape of the finish 14 will not be modified during the container forming process. The finish 14 defines an inner opening 16 extending along the longitudinal axis A and is delimited by a wall that is outwardly provided with a thread allowing the container 1 to receive a correspondingly threaded cap (not shown). Alternatively, the threads may be omitted and the finish 14 closed and sealed by other known methods. The closed end 12 has, for example, a hemispherical shape. The above described shape is given as a non-restricting example and other shapes can be foreseen. Additionally, the preform may be provided in a continuous extruded form, instead of injection molded form as is described above. When provided in an extruded form, the preform is generally provided as a continuous tube or cylinder without a thread.

The preforms 2, when provided in the injection molded form, can be produced at a remote location from the forming machine. In such an instance, the preforms 2 are formed, stored and shipped from their location of manufacture to the location of the forming machine 4.

In the description that follows, the term "preform" is used to refer to the preform both in its initial shape, as well as during the forming process and its deformation into the container. The term "container" is used to refer to the fully or substantially fully deformed and molded preform. Thus, the "container" is the end product that is discharged from the machine.

As seen in FIG. 1, the preforms 2 are successively loaded in the machine and transferred to a heating station 3. The heating station 3 is conventional and will not be described in detail herein. The heating station 3 is arranged to heat each of the successive preforms 2 to a temperature between the glass transition temperature and the crystallization material of the thermoplastic material of the preform 2. As a result, the preforms 2 are brought into a malleable state where they are able to be deformed under the influence of an increased pressure inside of the heated preforms 2. Alternatively, the preforms 2 can be injection molded at the same location as the forming machine, such that the injected formed preforms, still warm from the injection molding process, are directly transferred to the inlet of the forming machine. This allows for a reduction in the energy required for heating the preforms 2 before the forming step.

Each heated preform 2 is then transferred, by means of a transfer wheel 18, to a forming station 4. The transfer wheel 18 includes a placing mechanism arranged to receive a preform and then locate the preform in a forming station 4. The transfer wheel 18 and placing mechanisms are conventional and therefore not further discussed or described herein.

The forming stations 4 are preferably carried by a forming wheel 20 rotating around an axis B, which is may be parallel to the axis A. The number of forming stations 4 on the transfer wheel 20 is for illustrative purposes only. The actual number of forming stations 4 on the forming wheel 20 will depend on the specific design of the forming wheel 20 and machine. The forming and filling step, which are subsequently described, is carried out in the forming stations 4 during the rotation of the forming stations 4 with the forming wheel 20. Rotating in this manner, the forming stations 4 allow for the forming and filling of a plurality of preforms 2 at the same time.

Figure 2:
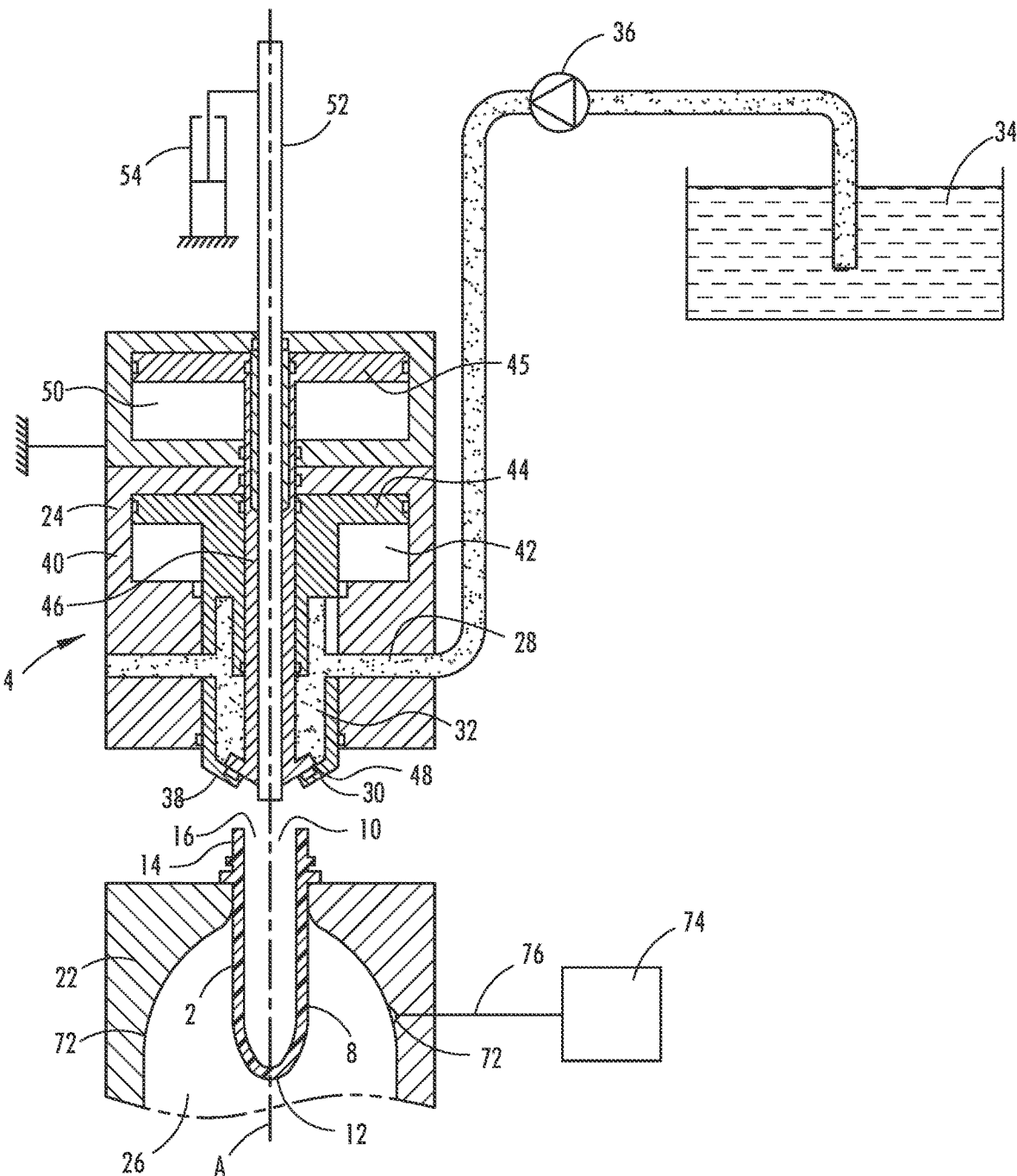
FIG. 2 is a diagrammatical cross-section views of part of a forming station at an initial stage of forming of a container.
Figure 3:
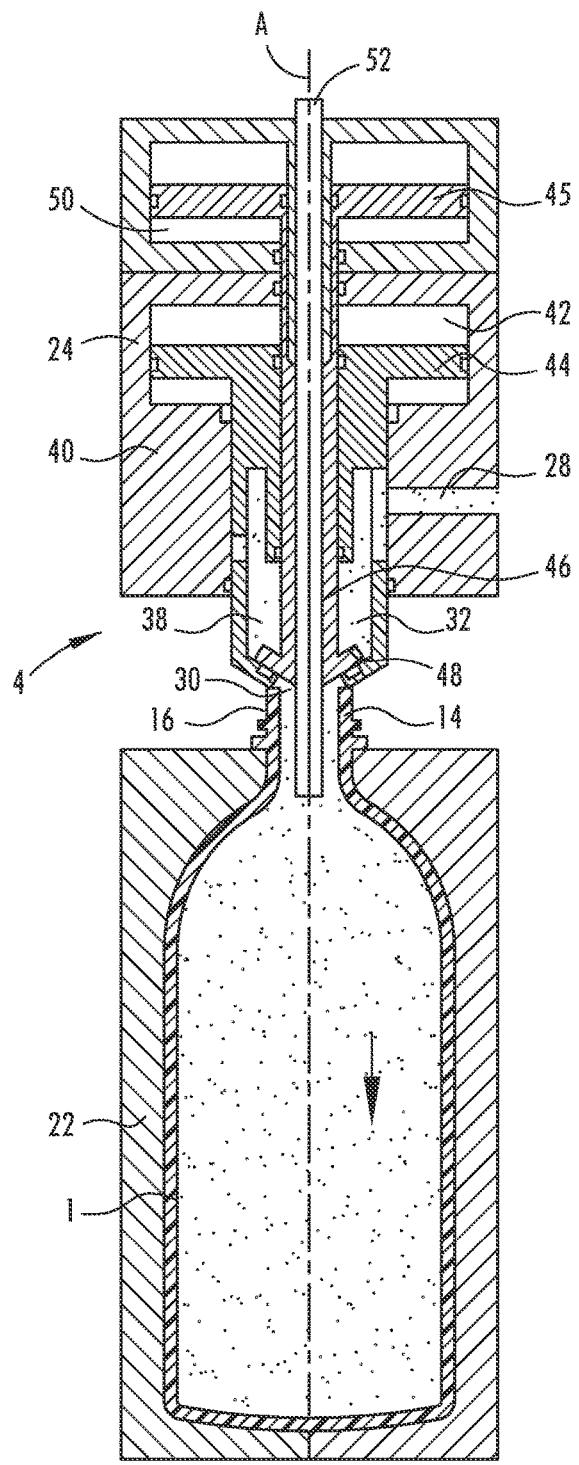
FIGS. 3 and 4 are diagrammatical cross-section views of part of a forming station at subsequent stages of form a container.
Figure 4:
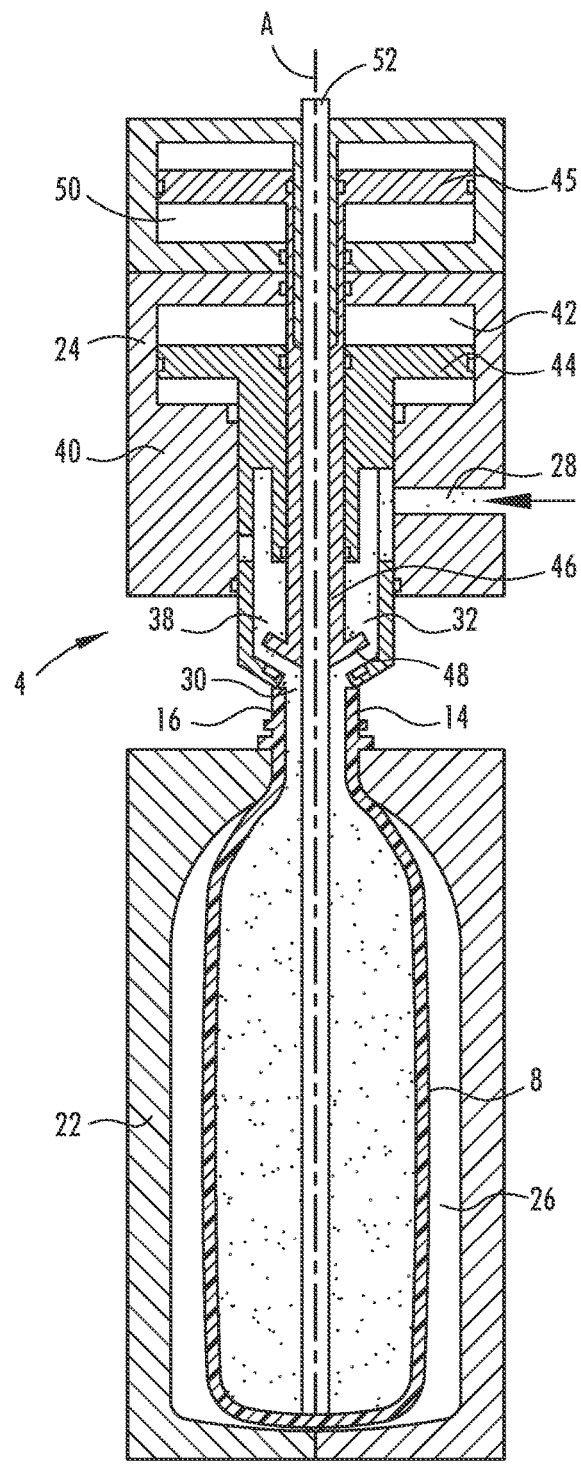

Each forming station 4 includes a mold 22 and an injection head 24. The mold 22 received the preform 2 and the injection head 24 is arranged to inject a forming liquid into the heated preform 2 in the mold 22, as shown in FIGS. 2 to 4. Such a forming station 4 is conventional for a hydraulic blow molding process.

As previously noted, hydraulic blow molding is process that uses a pressurized liquid, injected inside of the preform 2 while the preform 2 is inside the mold 22, to deform the preform 2 into the container 1 and simultaneously fill the container 1. The shape of the container 1 is defined by the internal surfaces forming the mold cavity 26 of the mold 22. Advantageously, the injected liquid, or molding medium, is the end product contained within the container 1, i.e. the end product that is intended to be provided to a consumer using the container 1.

The hydraulic blow molding technique has several advantages compared to the conventional air blow molding technique, wherein the container 1 is first formed by injecting a compressed gas, for example pressurized air, in the preform 2. One of these advantages is that the obtained container 1 is simultaneously filled with the end product. Another advantage is that the filled containers 1 can be produced at a higher rate since the forming step of the container 1 is not separated from the filling step. The energy cost of hydraulic blow molding is reduced since there is no need to produce the compressed gas used in air blow molding. Higher pressures can also be easily be imparted to the preform with the forming liquid. Such pressures allow obtaining a container having a very satisfactory and defined shape since the wall of the preform 2 is urged against the wall of the mold 22 in an optimal manner. US-2014/0174034 discloses such a hydraulic blow molding technique.

As noted above, the mold 22 defines the molding cavity 26 in the desired shape of the container 1 to be produced. The mold 22 includes at least two halves movable relative to each other between an opened position and a closed position. The two halves are, for example, hinged together and are movable in rotation relative to each other around an axis substantially parallel to the axis A of the preform 2. Each half of the mold 22 includes a body defining a hollow recess in the shape of half of the container 1 to be formed. According to a non-limiting example, the hollow recess of one half is generally semi-cylindrical and closed at its lower end by a bottom surface having the shape of a semi-circle. At its upper end, the recess is terminated a tapered shoulder defining portion, and then is semi-cylindrical with a shape substantially complementary to the shape of the body 8 of the preform 2 to hold the preform 2 in the mold 22. The hollow recess of the other half of the mold 22 is symmetrical to the hollow recess described above. In the opened position, the halves of the mold 22 are separated from each other such that the preform 2 can be introduced between the two halves. In the closed position, the two halves are applied against each other to form a closed mold 22, such that the hollow recesses face each other and together define the mold cavity 26 having the shape of the container 1 to be formed. The mold 22 may have more than two parts. For example, a third part having the shape of the bottom of the container 1 could be provided to define the molding cavity 26 with the two halves defining just the shape of the body of the container 1.

The transfer wheel 18 is arranged to move each preform 2 into a mold 22, which is in the opened position at an inlet position 27 of the forming wheel 20. Once the preform 2 is placed between the open halves of the mold 22, the mold 22 is moved into its closed position and carries the preform 2 in rotation with the forming wheel 20, the mold 22. When the preform is placed in a mold 22, the molding cavity 26 is hermetically closed by the preform 2. The finish 14 of the preform 2 protrudes from the mold 22 such that its inner opening 16 remains accessible from outside the mold 22, as shown in FIG. 2.

The injection head 24, which injects the pressurized incompressible liquid into the preform 2, will now be described. The injection head 24 described herein and shown in the figures is an example of an injection device that can be used in hydraulic blow molding methods, and it is to be understood that other kinds of injection devices can be used with the methods described herein to form the containers 1.

The injection head 24 includes an inlet 28, an outlet 30 and a chamber 32 between the inlet 28 and the outlet 30 that places the inlet 28 in fluid communication with the outlet 30. The inlet 28 is in fluid communication with an incompressible forming liquid source 34, for example a water reservoir, via appropriate conduits and a pressurization mechanism 36, the latter of which is adapted to transfer the liquid from the liquid source 34 to the inlet 28 at a controllable predetermined pressure. According to the embodiment shown in FIG. 2, the pressurization mechanism 36 is a pump. Alternatively, the pressurization mechanism 36 can also be formed by a conventional piston or by other appropriate means allowing controlling the pressure of the liquid injected in the preform. According to an embodiment, the pressure applied by pressurization mechanism 36 is variable such that the liquid can be injected at different pressures in the preform 2.

The forming liquid source 34 is a source of a liquid 35 intended to be the end product or a component of the end product in the container 1. As used herein, the term "liquid" is intended to encompass non-gas, flowable mediums. The liquid 35 may therefore have a low viscosity (like water or alcohol), a medium viscosity (like edible oil or soup) or a high viscosity (like catsup or yogurt). Also the liquid 35 may be homogeneous or nonhomogeneous and is not intended to be limited to foodstuff. Non-limiting illustrative examples of liquids that may be utilized with the present invention include cleansing products (for body, house or automotive care), medical fluids, industrial fluids, automotive fluids, and agricultural fluids.

The outlet 30 of the injection head 24 is adapted to be placed in liquid tight fluidic communication with the opening 16 formed by the finish 14 of the preform 2, and therefore with the inner volume of the preform 2. By liquid tight fluidic communication, it is meant that when the outlet 30 is in fluid communication with the inner volume of the preform 2, the liquid 35 flows only in the inner volume of the preform 2 and not outside the preform 2.

The outlet 30 is defined by end portions of an injection nozzle 38 and is in fluidic communication with the chamber 32. The injection nozzle 38 is movable inside a housing 40 of the injection head 24, in translation along axis A between a retracted position (seen in FIG. 2) and an extended or active position (seen FIGS. 3 and 4). In the retracted position, the injection nozzle 38 is sufficiently spaced apart from the mold 22 to allow for positioning of a preform 2 in the mold 22 or for retrieval of a formed container 1 from the mold 22. In the extended position, the end of the injection nozzle 38 is placed in liquid tight engagement with, preferably, the top sealing surface that defines the end face of the finish 4 of the preform 2.

The chamber 32 of the injection nozzle 38 defines a hollow space having, in one example, a regular cylindrical portion and a conical portion extending between the regular cylindrical portion and the outlet 30 of the injection nozzle 38. The diameter of the conical portion is reduced progressively from the diameter of the regular cylindrical portion to the diameter of the outlet 30, which is at the end of the conical portion.

The housing 40 further includes a first upper compartment 42 arranged to receive actuation device 44 for moving the injection nozzle 38. The actuation device 44 is, in one example, a pneumatic actuation device comprised of a piston, attached to the injection nozzle 38 and hermetically separating the first upper compartment 42 into an upper and lower parts. For moving the injection nozzle 38 between its retracted position and its extended position, pressurized air is injected in the upper part of the first upper compartment 42 increasing the pressure in the upper part and moving the piston, and the injection nozzle 38, downward thereby reducing the volume of the lower part. Conversely, in order to move the injection nozzle 38 between its extended position and its retracted position, pressurized air is injected into the lower part of the first upper compartment 42 increasing pressure in the lower part and moving the piston, and the injection nozzle 38, upward. To regulate these movements, the respective decreases in pressure/volume in the lower and upper parts of the first upper compartment 42 is controlled and not just openly vented to atmosphere.

A hollow control rod 46 also extends in the chamber 34 along axis A. The control rod 46 is provided at its lower end with a sealing ring or head 48 located in the chamber 32. The sealing ring 48 has a shape complementary to the shape of part of the conical portion of the injection nozzle 38 forming a sealing seat, such that, when the sealing ring 48 is applied against the sealing seat, the sealing ring 48 and sealing seat hermetically close the chamber 32 and prevent liquid 35 from flowing through the outlet 30.

The control rod 46 is movable in translation along axis A between an injecting position, shown in FIG. 3, wherein the sealing ring 48 is spaced from the sealing seat placing the outlet 30 in fluidic communication with the inlet 28 via the chamber 32, and a sealing position, shown in FIGS. 2 and 4, wherein the sealing ring 48 is applied against the sealing seat of the cone portion of the injection nozzle 34.

The housing 40 further includes a second upper compartment 50 arranged to receive an actuation device 45 for moving the control rod 46. The actuation device 45 is preferably pneumatic actuation device, similar to that discussed above in connection with the first upper compartment 42, and is, for example, a piston attached to the control rod 46. The actuation device 45 thus operates in the same manner as described above and, therefore, is not further described herein.

According to the embodiment shown in the FIGS. 2-4, a stretch rod 52 extends through the hollow control rod 46, passes through the outlet 30 and extends into the preform 2.

The stretch rod 52 assists in the axial deformation of the preform 2. The stretch rod 52 is movable in translation along axis A in the hollow control rod 46 and is actuated by an appropriate actuation device 54, such as for example a servo motor or a magnetic actuation means. The functioning of the stretch rod 52 is known and will not be described in detail herein.

For forming and filling a container 1 from a preform 2, once a preform 2 has been placed in a mold 22 and the mold closed, the injection nozzle 38 is moved in its extended position and the control rod 46 is moved to its injecting position. The liquid 35 from the liquid source 34 then flows through the outlet 30 and into the inner volume of the preform 2 at a predetermined pressure, which may be around 5 bars. At this pressure, the liquid 35 causes the preform 2, which is in a malleable state, to expand towards the various walls of the molding cavity 26, as seen in FIG. 3. As known, this expansion can be assisted in the axial direction by extending of the stretch rod 52. In order to completely urge the wall of the preform against the wall of the molding cavity 26, a pressure peak is applied to the liquid 35 inside the now formed container 2 such that the pressure inside the preform increases up to, for example, around 35 bar, is held for about 0.010 seconds and is then reduced to about 15 bar. Such a held pressure peak allows for the imprint of designs, letters and logos, on the external surface of the container wall, and in accordance with the present invention, the imprinting of tactile writing, such as braille (a system of touch reading used by blind persons). Forming braille dots, in accordance with braille standards, has not been heretofore possible in plastic containers.

In braille, raised dots are evenly spaced in quadrangular character/letter spaces that are also a fixed width apart. Each character space is called a cell and may contain up to a maximum of six dots in a two dots wide and three dots high array. Through the various arrangements of dots in a cell, 63 different characters can be formed. Provided in a manner that allows the dots to be distinguishable from the background, the characters are perceptible by touch with a fingertip.

In accordance with the present invention, a container 1 is provided having braille dots 58 in accordance with braille standards. The braille dots 58 are provided on and formed by the surface of the container 1, not a label attached to the container. In a preferred embodiment, the braille dots 58 meet the standards put forth by the American National Standard Institute (ANSI), International Building Code, ANSI 703.4. Accordingly, the braille dots 58 provided on and formed by the surface of the container meet the requirements of Table 1.

TABLE 1

| MEASUREMENT RANGE | MINIMUM TO MAXIMUM DIMENSION |
| --- | --- |
| Dot height | 0.025 to 0.037 inches (0.6 to 0.9 mm) |
| Dot base diameter | 0.059 to 0.063 inches (1.5 to 1.6 mm) |
| Distance between dots in the same cell | 0.090 to 0.100 inches (2.3 to 2.5 mm) |
| Distance between corresponding dots in adjacent cells | 0.241 to 0.300 inches (6.1 to 7.6 mm) |
| Distance between corresponding dots in cells directly above or below | 0.395 to 0.400 inches (10.0 to 10.2 mm) |

More preferably, the braille dots 58 meet the standards put forth by the National Library Service for the Blind and Physically Handicapped (NLS), Library of Congress, in Specification 800, "Braille Books and Pamphlets", Section 3.2. Accordingly, the braille dots 58 provided on and formed by the surface of the container meet the requirements of Table 2.

TABLE 2

| NOMINAL MEASUREMENT RANGE | NOMINAL DIMENSION |
| --- | --- |
| Dot height | 0.019 inches (0.48 mm) |
| Dot base diameter | 0.057 inches (1.44 mm) |
| Distance between dots in the same cell | 0.092 inches (2.34 mm) |
| Distance between corresponding dots in adjacent cells | 0.245 inches (6.2 mm) |
| Distance between corresponding dots in cells directly above or below | 0.400 inches (10.0 mm) |

Figure 5:
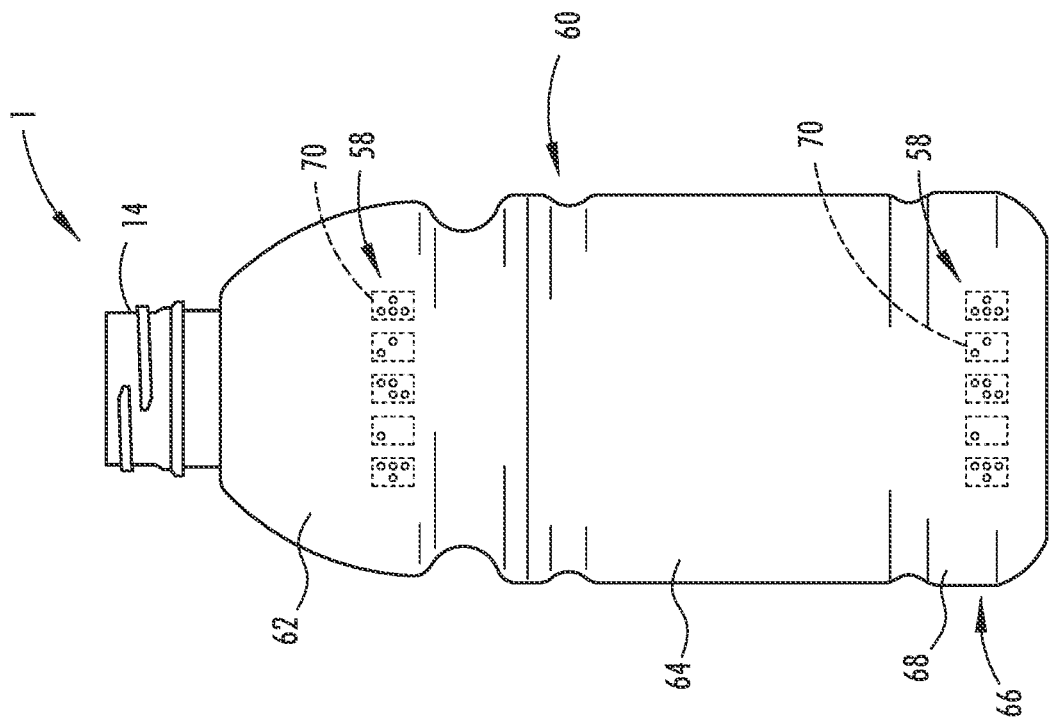
FIGS. 5 and 6 are side views of containers formed in accordance with the principles of the present invention.
Figure 6:
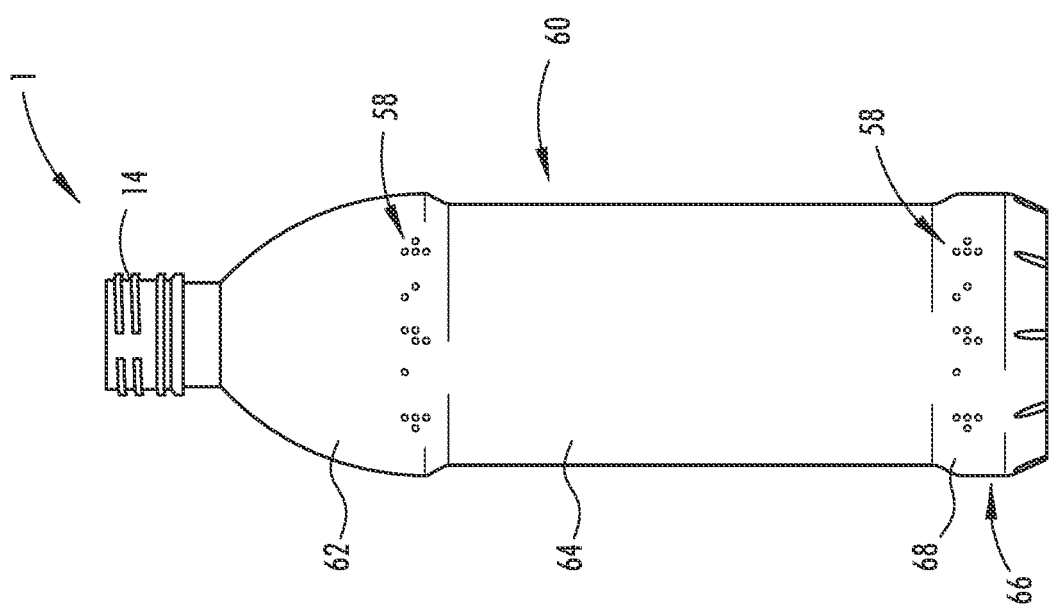

As seen delineated in FIGS. 5 and 6, the containers 1 are generally formed having the previously mentioned finish 14 from which extends the body 60 of the container 1. The body 60 may be further delineated as including, proceeding away from the finish 14, a shoulder 62, a sidewall 64 and a base 66. Between these portions, the body 60 may include various transitions, such as recesses, ribs or tapered lands. Each of these portions may also have shapes or features other than those seen in the figures. For example, the shoulder 62 is illustrated as being convexly domed, but may be concavely domed, conical, or a combination of shapes. The sidewall, shown as being a smooth, round cylinder, may be otherwise shaped and/or may include vacuum panels, ribs and other features. The base 66 may include a smooth, round cylindrical heel 68 with a flat profile, as shown, or exhibit a curved profile.

In locating the braille dots 58 with respect to the container 1, as shown in FIGS. 5 and 6 the braille dots 58 are provided on a lower portion of the shoulder 62 and on the heel 68 of the container 1. In this manner, the braille dots 58 are provided in a location that does not interfere with or is not interfered by a label attached to the container 1 about the cylindrical sidewall of the container 1. Providing the braille dots 58 in these locations also allows the container to be held in one hand while permitting the braille dots 58 to be read by a finger of the other hand of the user. As illustrated, twelve braille cells are provided on each container, six on the shoulder 62 and six on the heel 68. Depending on the desired text, fewer or greater cells could be provided. Individual cells are outlined in phantom, and representatively designated at 70, in FIG. 6.

The braille dots 58 are intended to provide information to the end consumer, who may be blind or otherwise visually impaired. The information provided may identify the contents of the container, such as "water" or "soap," may identify a characteristic of the contents, such "danger," "flammable" or "caustic," or may provide other information to the consumer, such as the quantity, e.g. "128 oz." or a desired feature, e.g. "organic." The information to be provided is only limited by the number of cells 70 that can be provided on the container 1.

Figure 7:
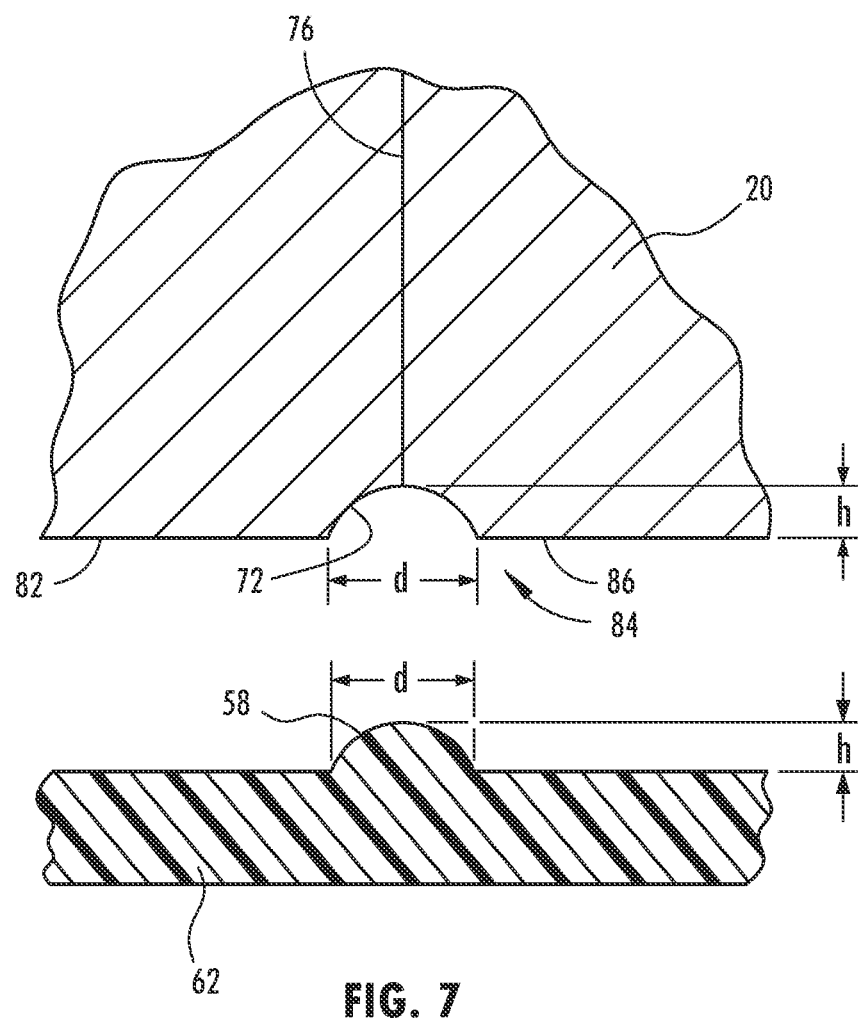
FIG. 7 is an enlarged, cross-sectional view of a braille dot on a container wall and a corresponding recess in the mold.

As seen in FIG. 7, in forming the braille dots 58, the mold 22 is provided with recesses 72, in the cavity surface 82, that form part of a tactile writing impression 84. The tactile writing impression 84 is comprised of a plurality of equidistantly spaced cells, and each cell defines a corresponding character formed by six or less of the recesses. Preferably, the size and shape of the recesses 72 in the cavity surface 85 of the mold 22 are the same size as specified above for the braille dots 58, and more preferably larger than the size of the desired braille dots 58 to be formed on the container 1.

When the recesses 72 are larger than the braille dots 58, preferably the recesses 72 have a nominal base diameter (d) and depth (h) (from the immediately surrounding cavity surface 86) that are not more than 10% greater than that the nominal base diameter (d) and height (h) of the desired braille dots 58, more preferably not more than 5% greater, and even more preferably between about 2-4% greater.

Optionally, formation of the braille dots 58 may be vacuum assisted. More specifically, the recesses 72 may be directly coupled to a vacuum source 74 via a vacuum line 76, which is at least partially provided in the mold 22. As used herein, directly coupled means that the vacuum line 76, where provided in the mold 22, terminates in the recess 72 itself and not otherwise in a surface of the mold 20 defining the mold cavity 26.

Once the container 1 is formed and filled with the liquid 35 at the end of the forming step, the control rod 46 moves back to its closed position, as shown in FIG. 4, and the injection nozzle 38 is moved back to its retracted position. The mold 22 is then opened and the formed and filled container 1 is retrieved from the mold 22 at an outlet 78 of the forming wheel 20, for example by a second transfer mechanism of a second transfer wheel 80, as shown in FIG. 1. The forming station 4 is then moved to the inlet 27 of the forming wheel 20, completing one molding cycle, and receives a new preform 2 and produce another container 1.

As mentioned previously, successive containers 1 can be produced continuously and simultaneously by providing several forming and filling stations 4 distributed on the periphery of the forming wheel 20. As seen in FIG. 1, for illustrative purposes, only eight forming and filling stations 4 are shown. The number of forming and filling stations 4 provided on the forming wheel 20 may be significantly greater than eight and is only limited by the size of the forming wheel 20 and the size of the forming and filling stations 4.

Comparative Samples

Optical profilometry (OP) images at six different locations on two embossed bottles were analyzed to characterize roughness of the features defined at each of the locations. Generally, enhanced roughness indicates a feature that is defined in greater detail. The two samples were created utilizing the same 58.2 gram preforms and mold to produce a container from polyethylene terephthalate (PET) having a 40 ounce targeted fill capacity (excluding overflow capacity) and a 58.2 gram targeted container weight. In producing the containers, one sample was formed utilizing pressurized air as the blowing medium and the other sample formed utilizing an incompressible fluid, namely water, as the molding medium. The pressurized air molding process was conducted on a production machine and employed conventional parameters currently in use in production runs for the manufacturing of similarly sized and shaped containers from PET preforms. The peak air blow pressure of the process was 40 bar. The molding process using water as the incompressible molding medium was conducted on a lab machine and employed parameters simulating those as might be used in an actual production run for the manufacturing of the containers from PET preforms. The peak liquid molding (blow) pressure was 35 bar. As a result, the principle difference between the resultant samples was that one utilized pressurized air as the molding medium (with a peak pressure at 40 bar) and the other used water (with a peak pressure at 35 bar). The resultant samples were identified as being either "Air Blown" or "Liquid Blown."

Figure 8A:
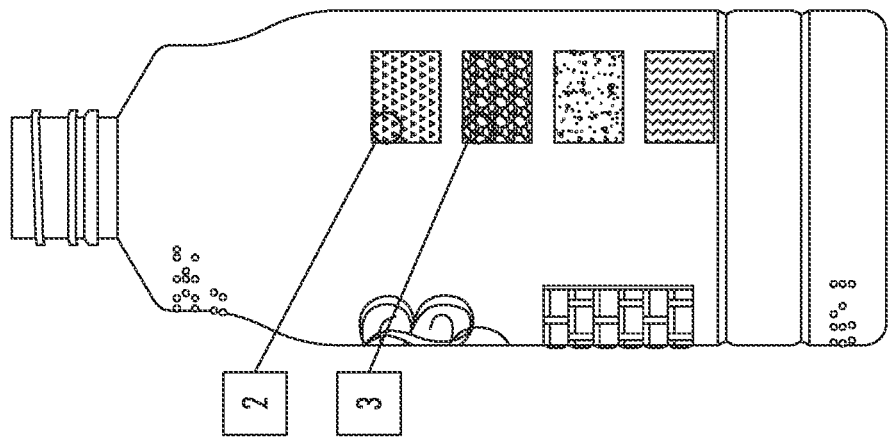
FIGS. 8A, 8B and 8C are front, left side and right side view of a container formed in accordance with the principles of the present invention, having various indicia formed therein and showing locations 1-6 analyzed herein.
Figure 8B:
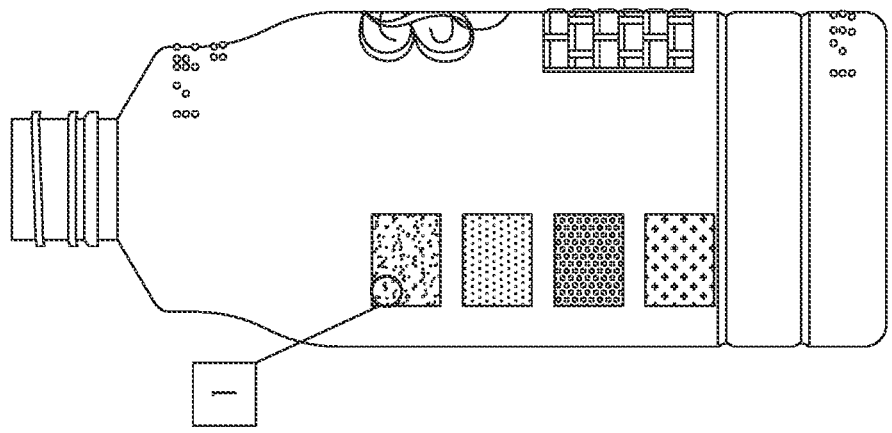
Figure 8C:
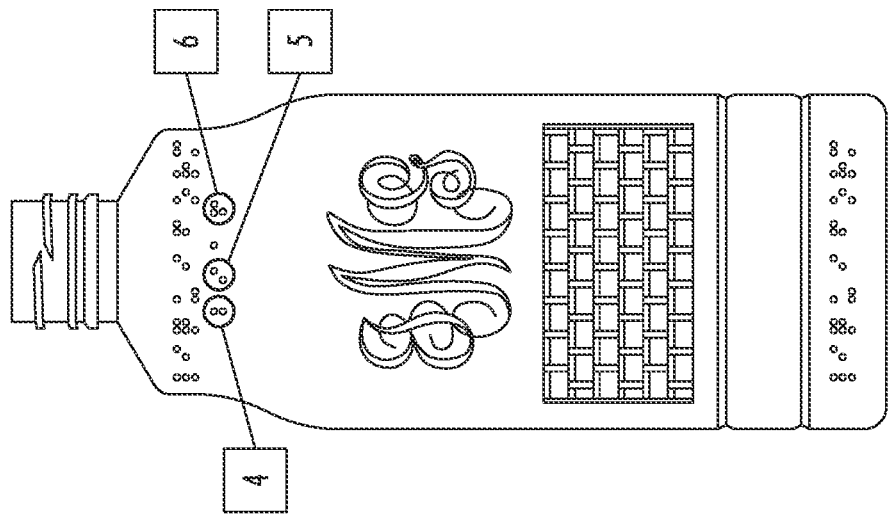
Figure 9A:
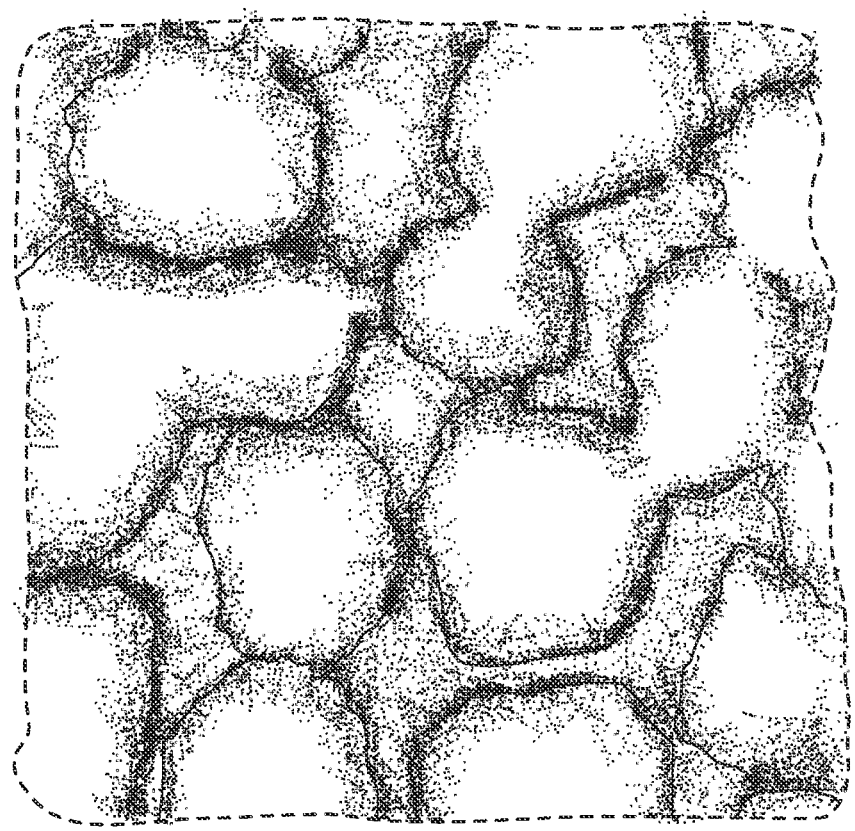
FIGS. 9A and 9B are respectively two dimensional (2D) and three dimensional (3D) images taken at location 1 on an air blown container.
Figure 9B:
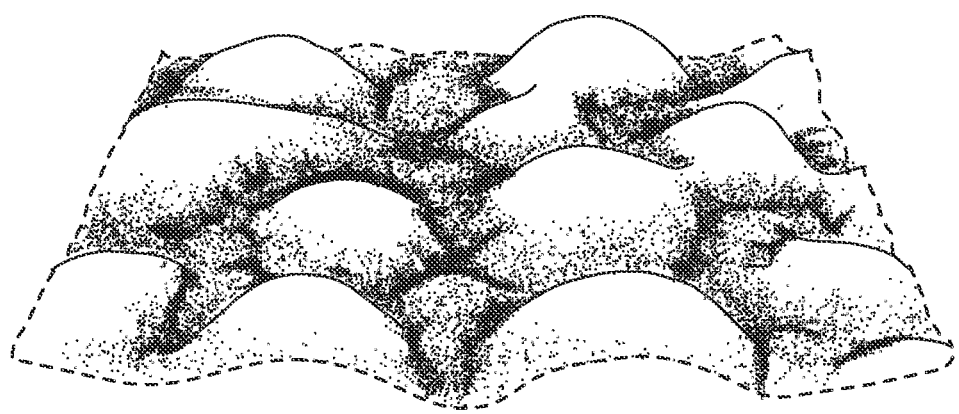
Figure 10A:
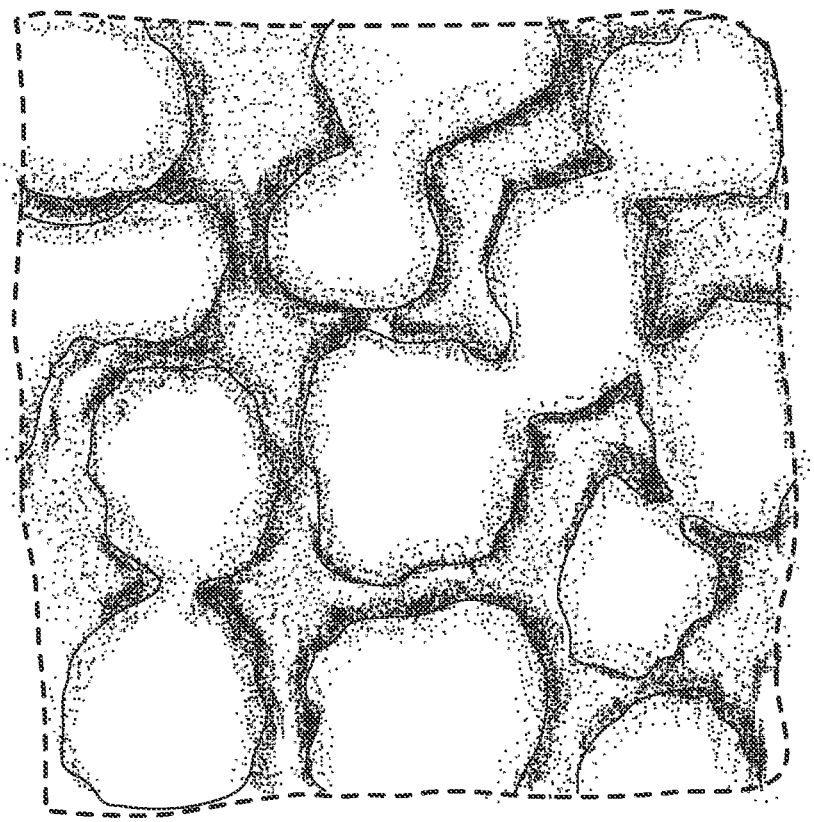
FIGS. 10A and 10B are respectively two dimensional (2D) and three dimensional (3D) images taken at location 1 on a liquid blown container.
Figure 10B:
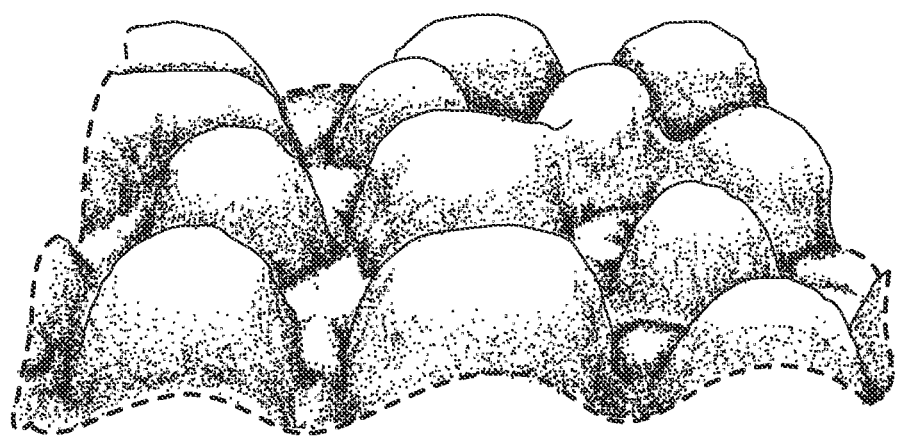
Figure 11A:
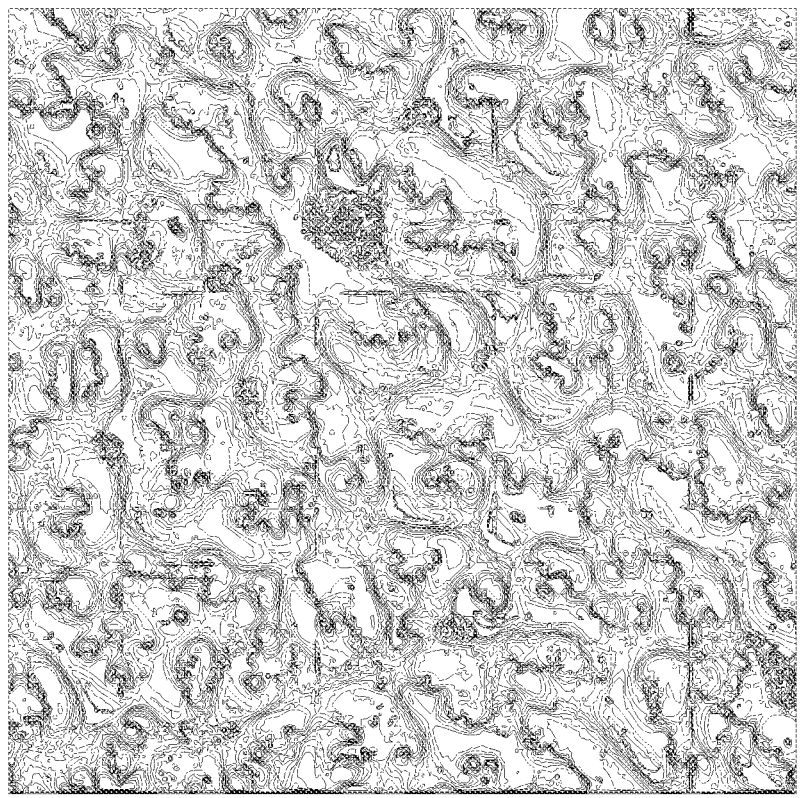
FIGS. 11A and 11B are respectively two dimensional (2D) and three dimensional (3D) images taken at location 2 on an air blown container.
Figure 11B:
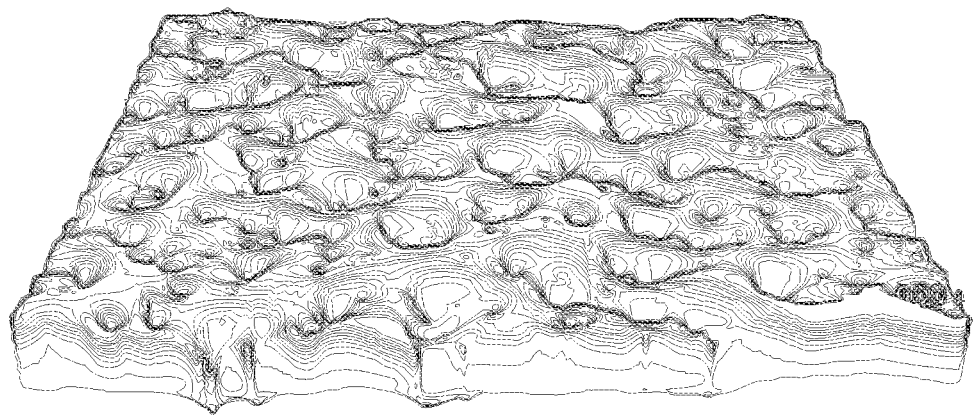
Figure 12A:
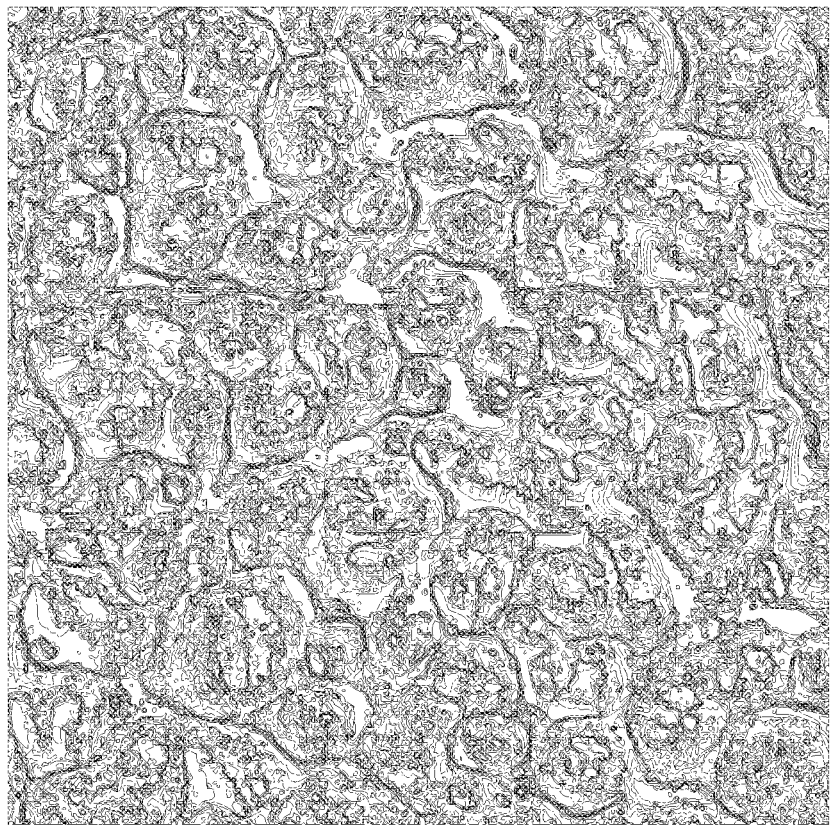
FIGS. 12A and 12B are respectively two dimensional (2D) and three dimensional (3D) images taken at location 2 on a liquid blown container.
Figure 12B:
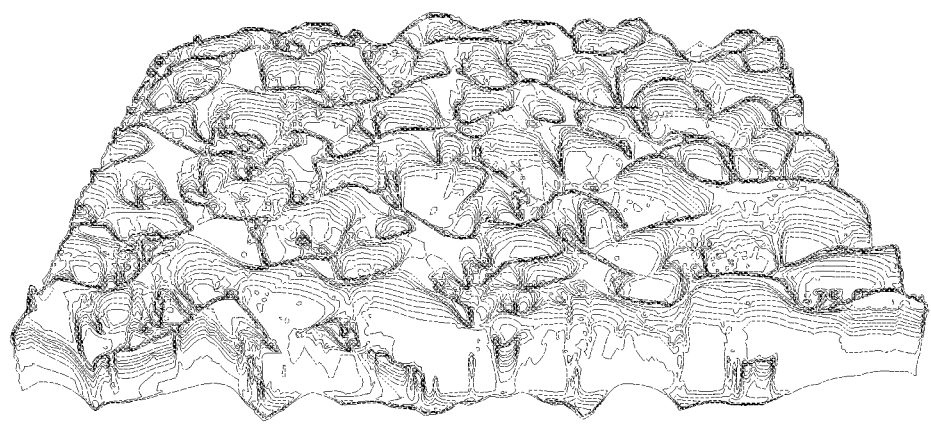
Figure 13A:
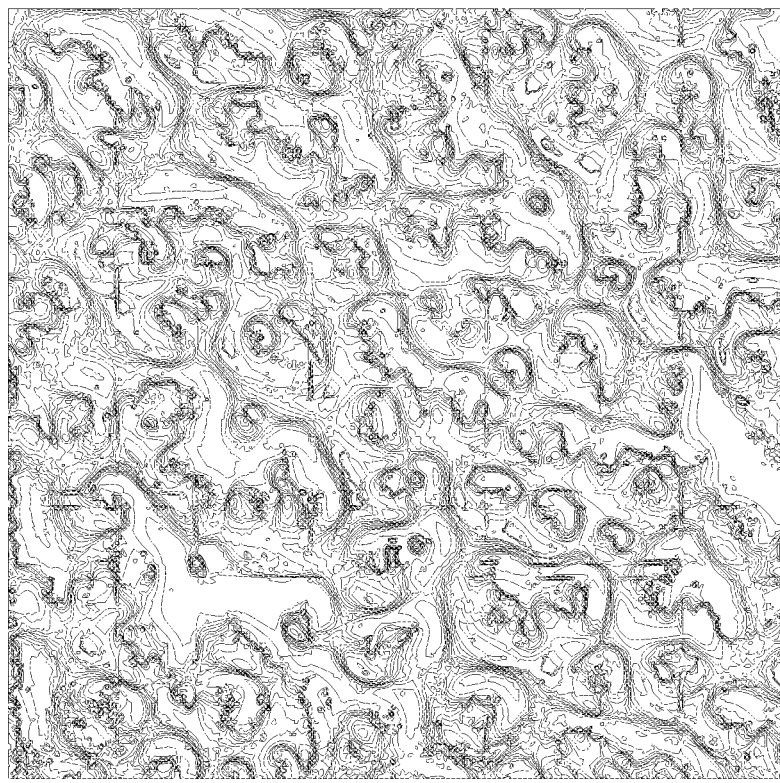
FIGS. 13A and 13B are respectively two dimensional (2D) and three dimensional (3D) images taken at location 3 on an air blown container.
Figure 13B:
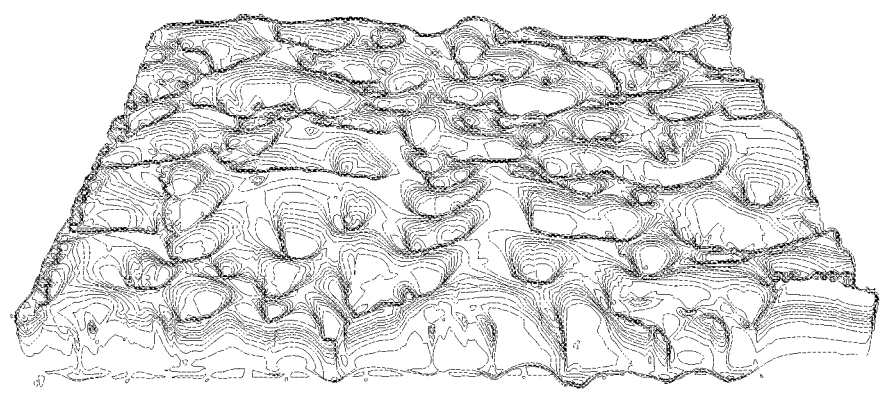
Figure 14A:
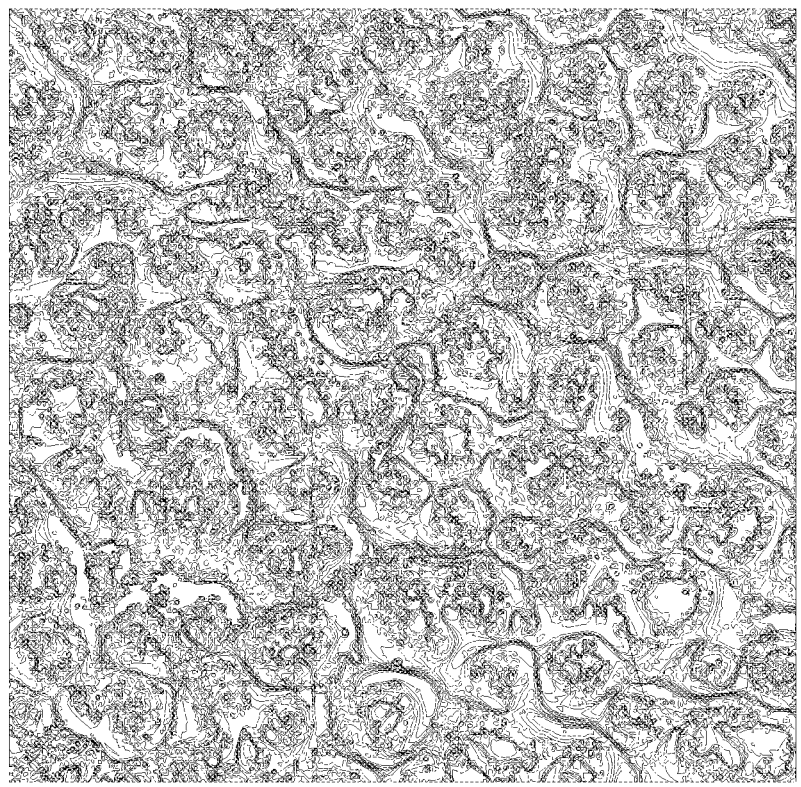
FIGS. 14A and 14B are respectively two dimensional (2D) and three dimensional (3D) images taken at location 2 on a liquid blown container.
Figure 14B:
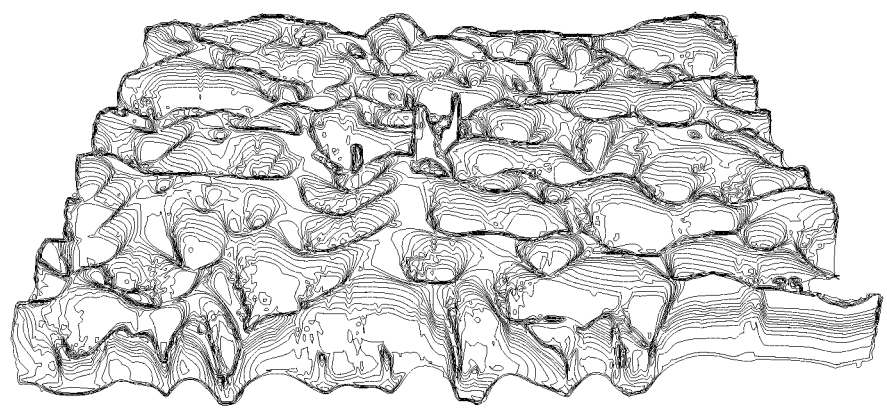
Figure 15A:
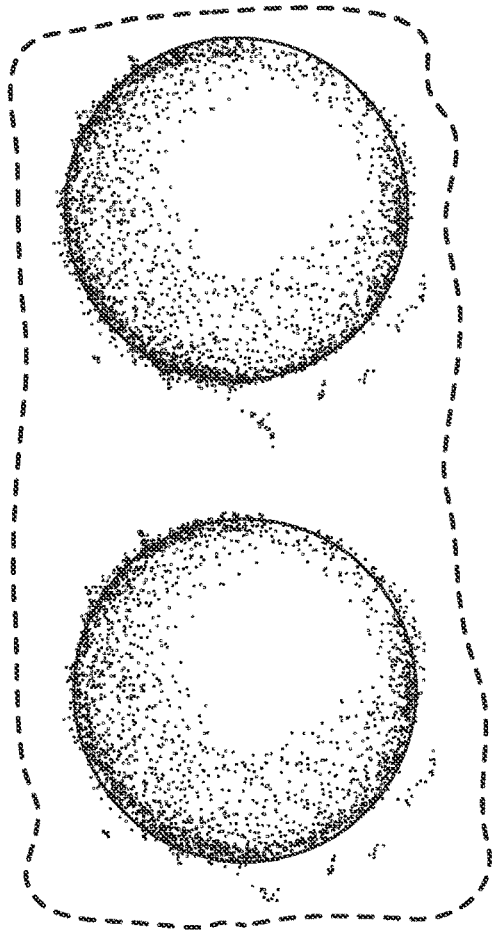
FIGS. 15A and 15B are respectively two dimensional (2D) and three dimensional (3D) images taken at location 4 on an air blown container.
Figure 15B:
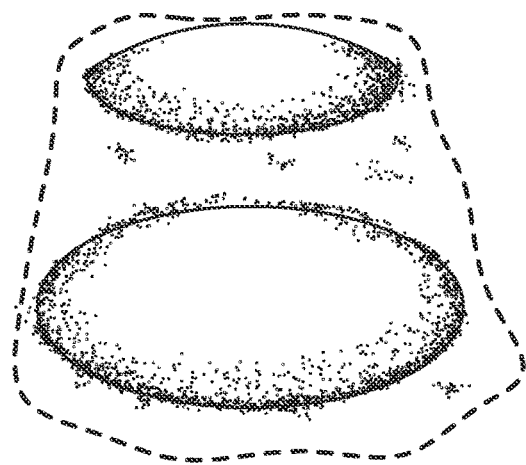
Figure 16A:
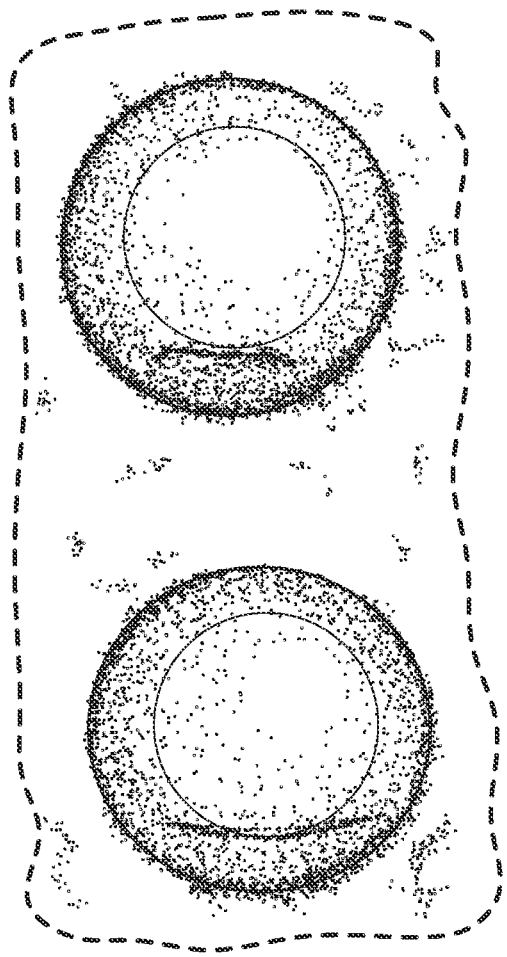
FIGS. 16A and 16B are respectively two dimensional (2D) and three dimensional (3D) images taken at location 4 on a liquid blown container.
Figure 16B:
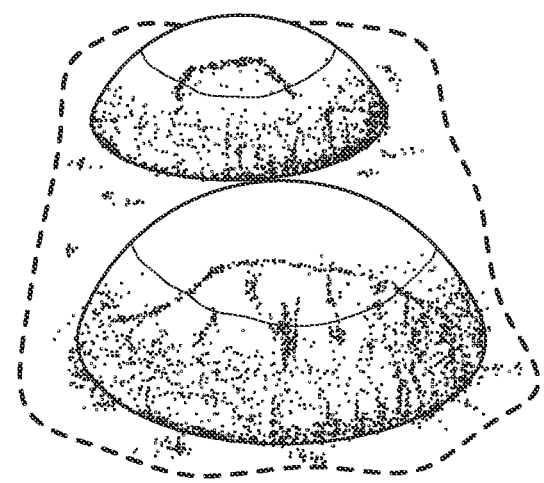
Figure 17A:
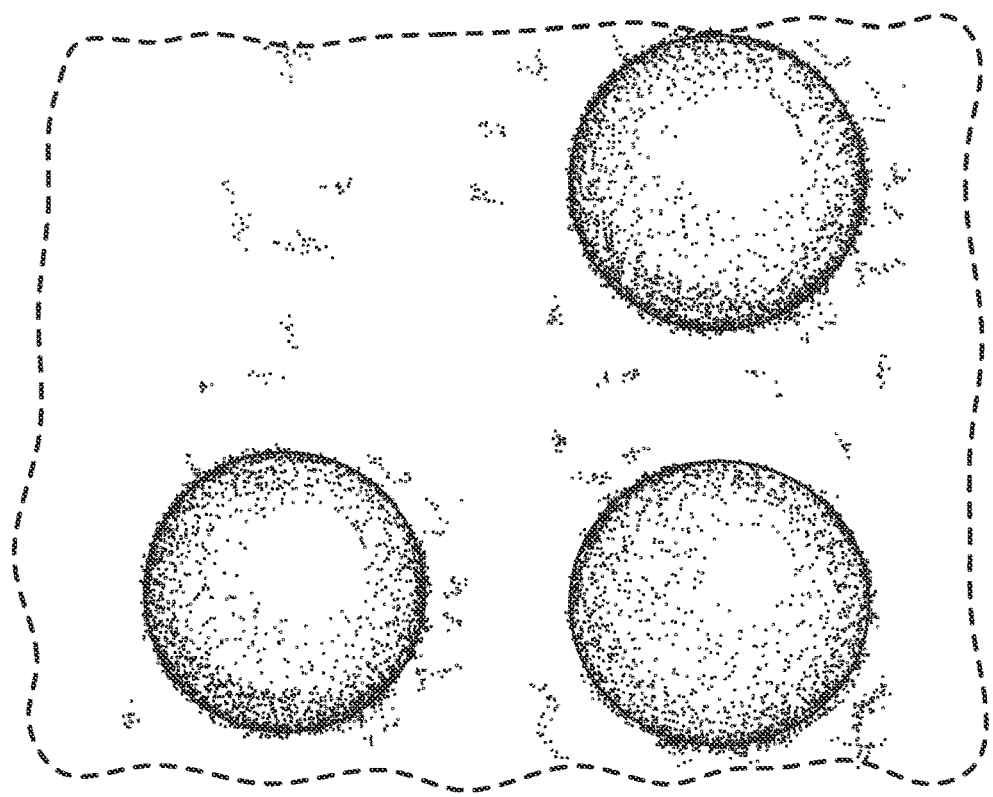
FIGS. 17A and 17B are respectively two dimensional (2D) and three dimensional (3D) images taken at location 5 on an air blown container.
Figure 17B:
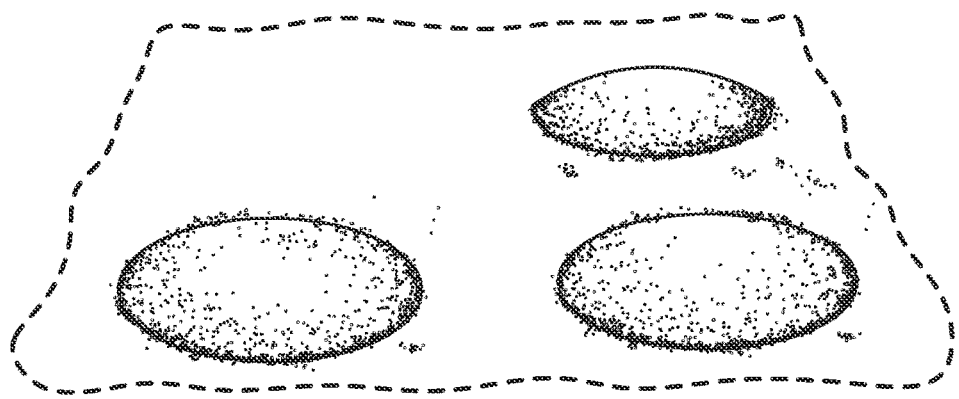
Figure 18A:
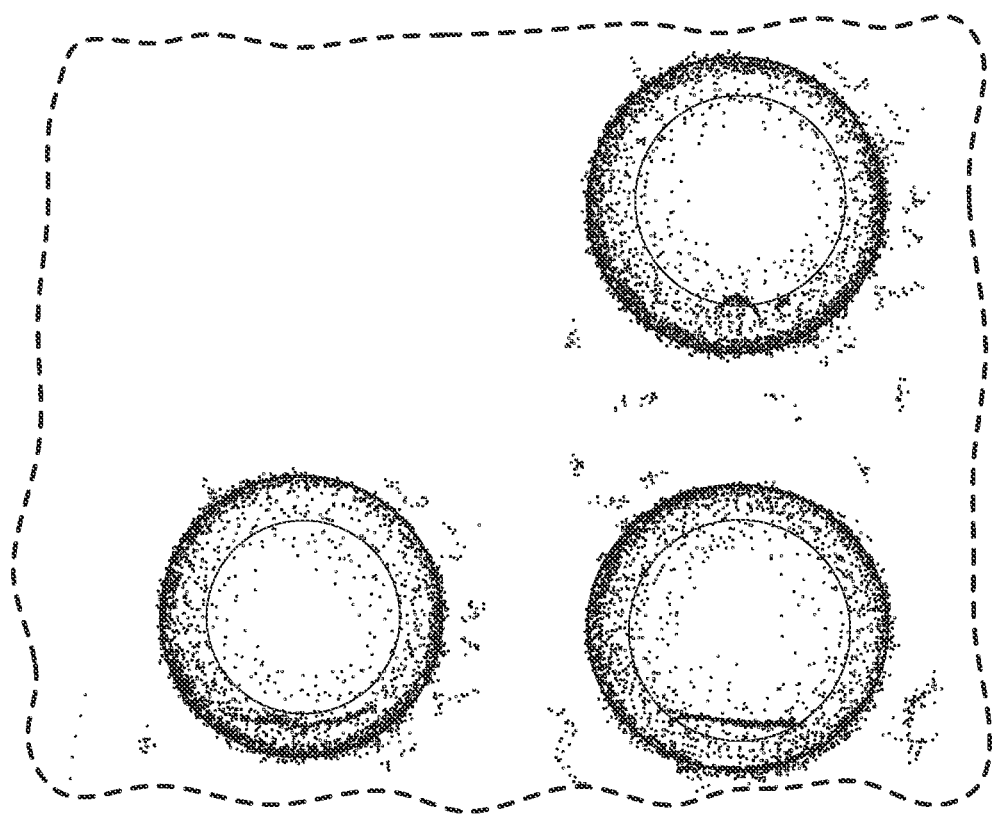
FIGS. 18A and 18B are respectively two dimensional (2D) and three dimensional (3D) images taken at location 5 on a liquid blown container.
Figure 18B:
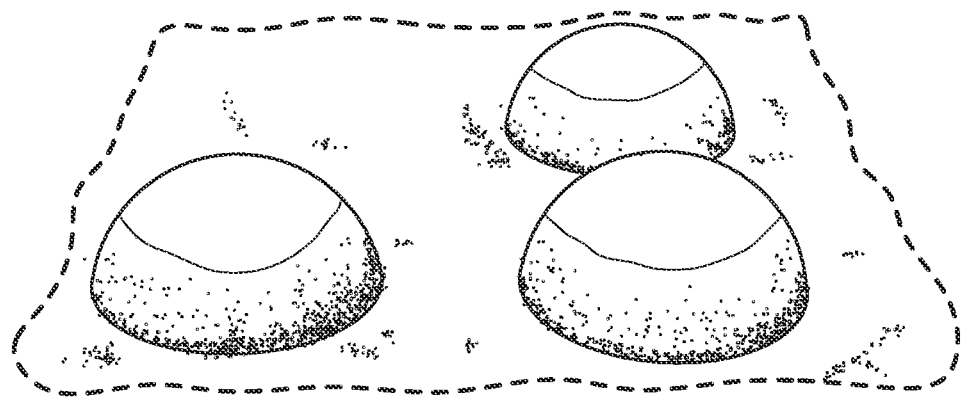
Figure 19A:
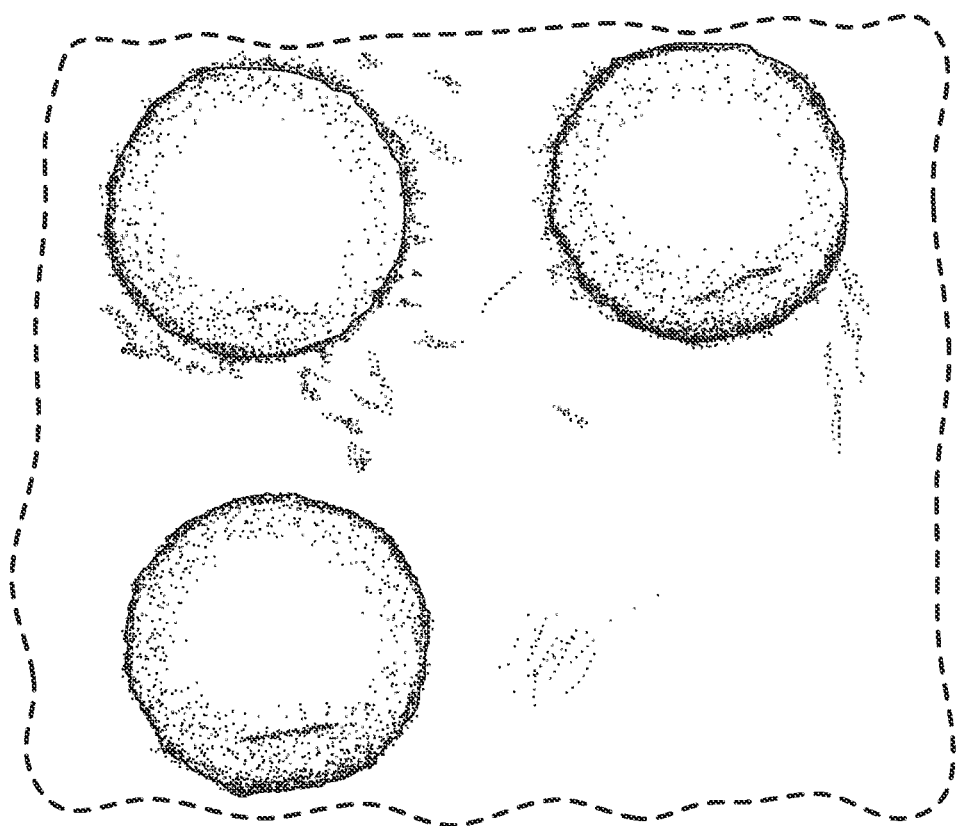
FIGS. 19A and 19B are respectively two dimensional (2D) and three dimensional (3D) images taken at location 6 on an air blown container.
Figure 19B:
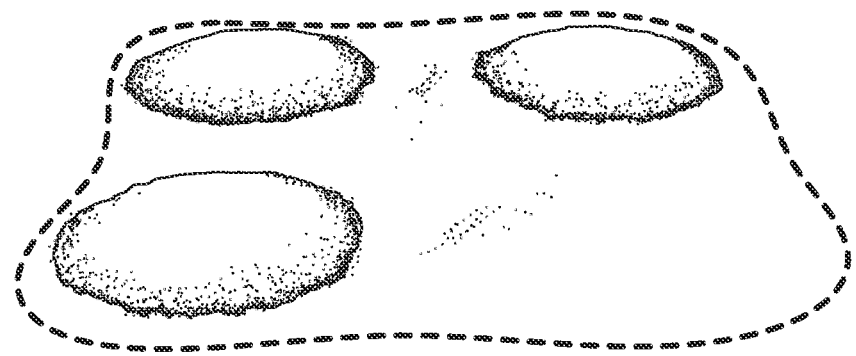
Figure 20A:
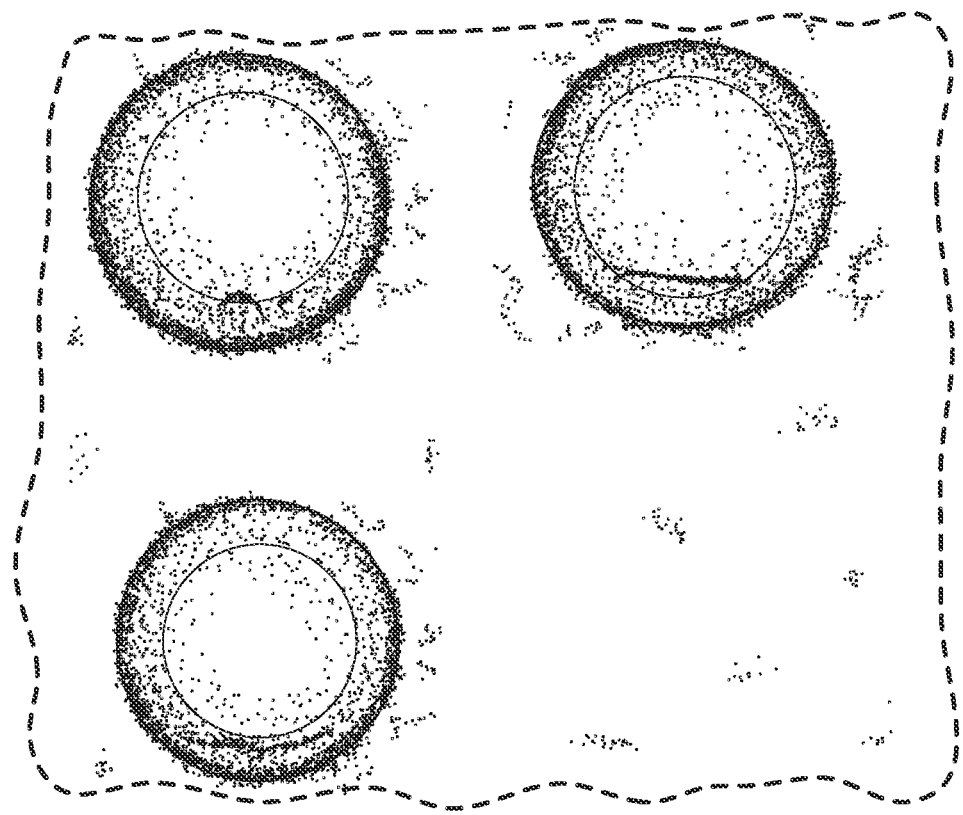
FIGS. 20A and 20B are respectively two dimensional (2D) and three dimensional (3D) images taken at location 6 on a liquid blown container.
Figure 20B:
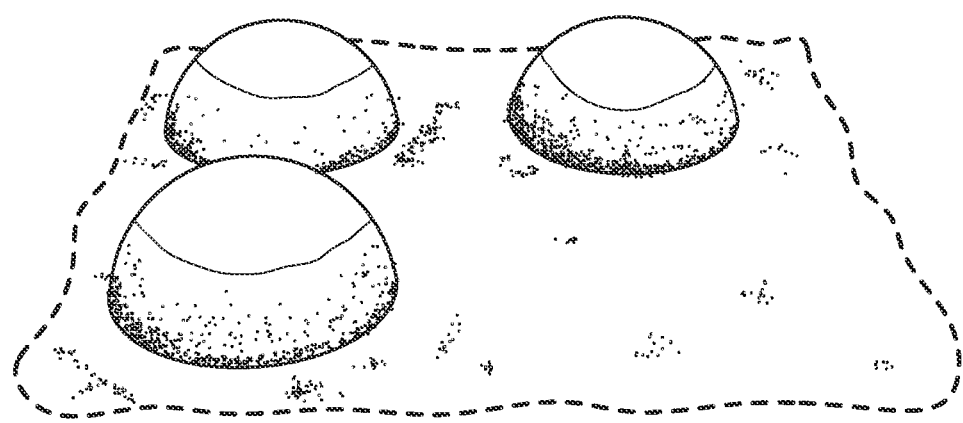
Figure 21A:
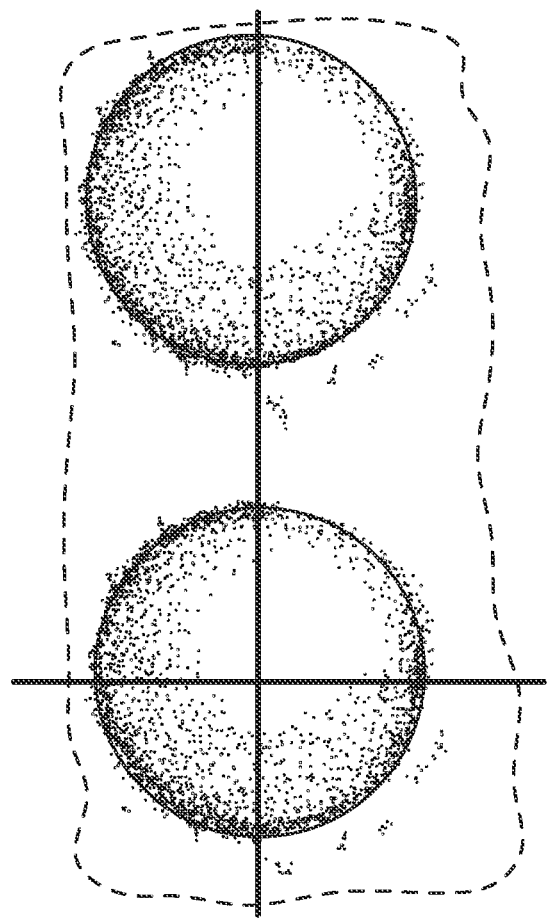
FIG. 21A is the two dimensional (2D) image of the air blown container at location 4 and shows the locations of x and y profiles for sectional analysis.
Figure 21B:
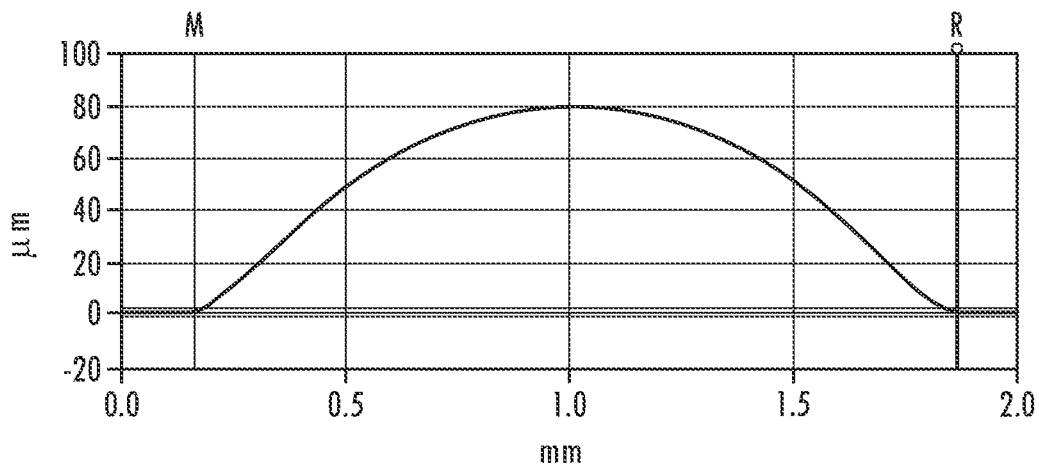
FIG. 21B shows the sectional analysis of the x and y profiles of the air blown container at location 4.
Figure 21B:
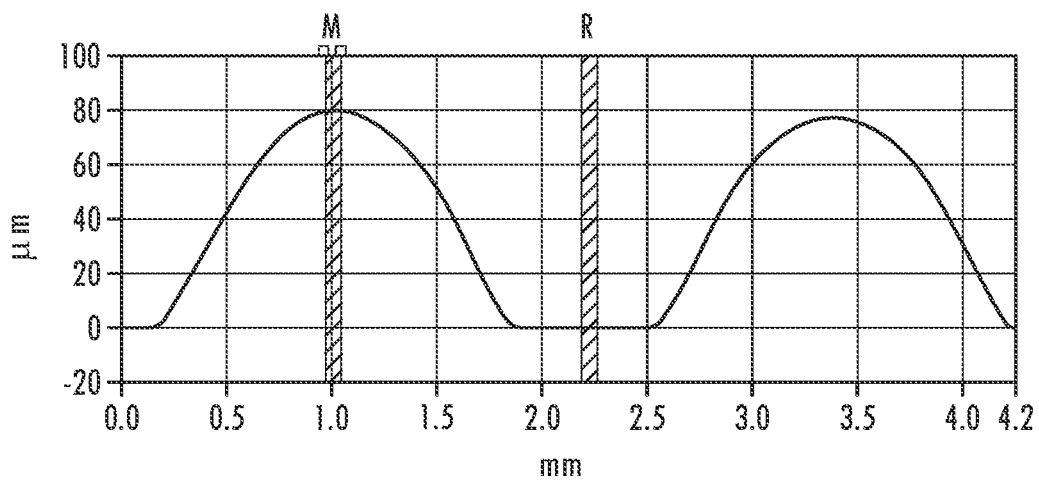
Figure 22A:
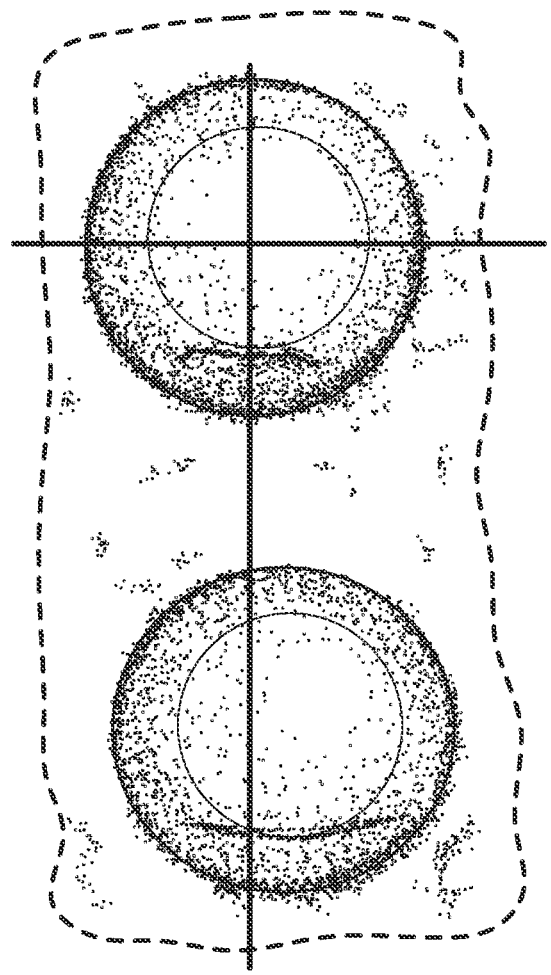
FIG. 22A is the two dimensional (2D) image of the liquid blown container at location 4 and shows the locations of x and y profiles for sectional analysis.
Figure 22B:
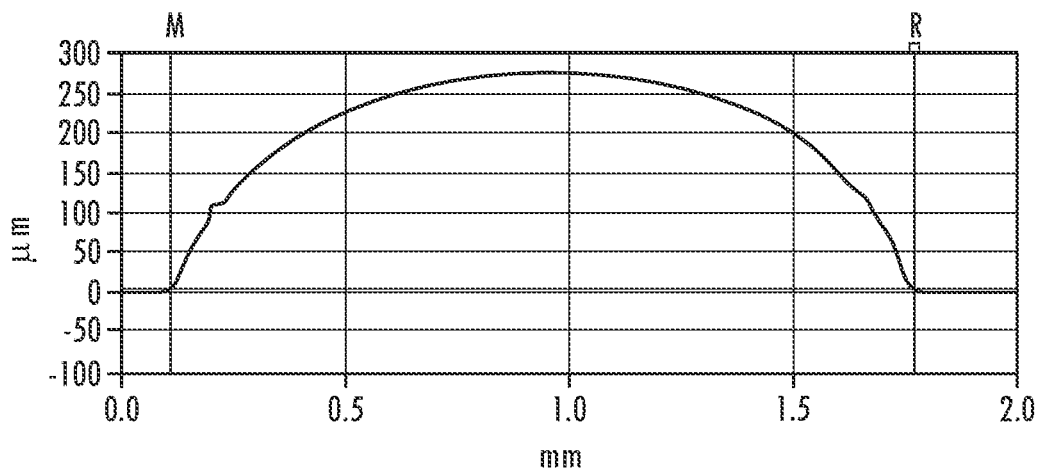
FIG. 22B shows the sectional analysis of the x and y profiles of the liquid blown container at location 4.
Figure 22B:
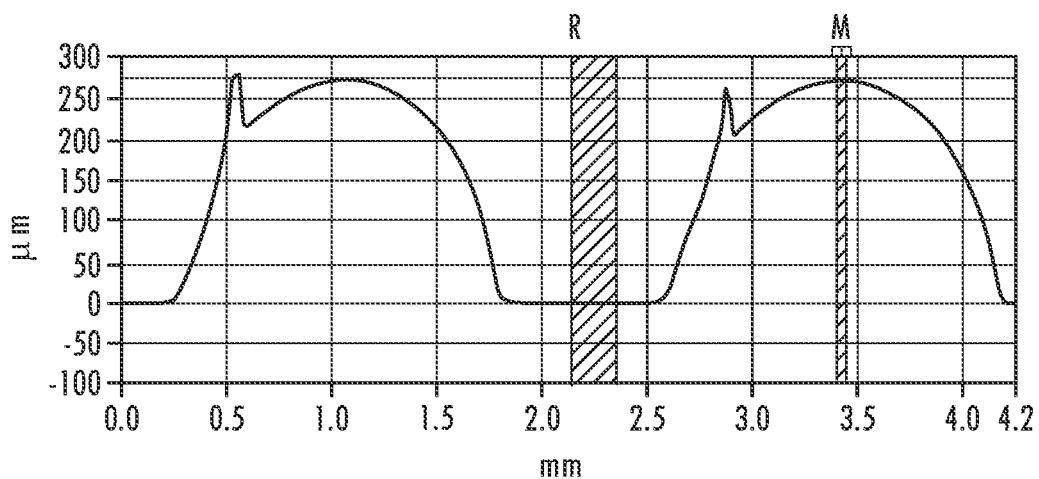
Figure 23A:
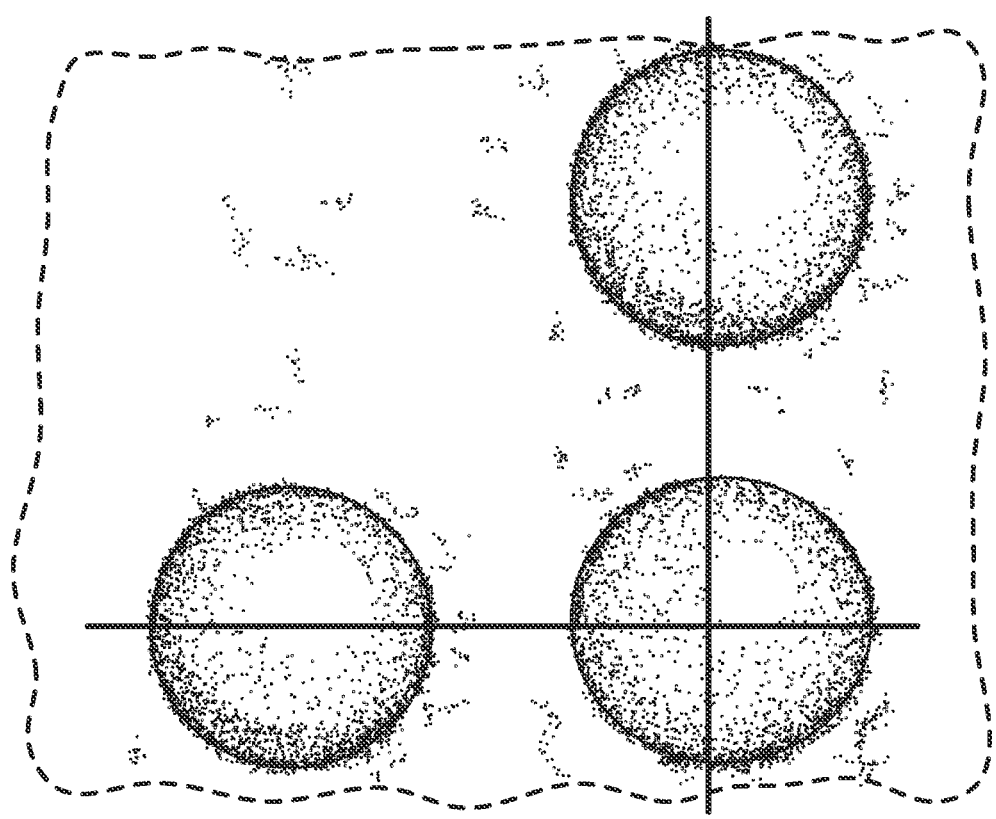
FIG. 23A is the two dimensional (2D) image of the air blown container at location 5 and shows the locations of x and y profiles for sectional analysis.
Figure 23B:
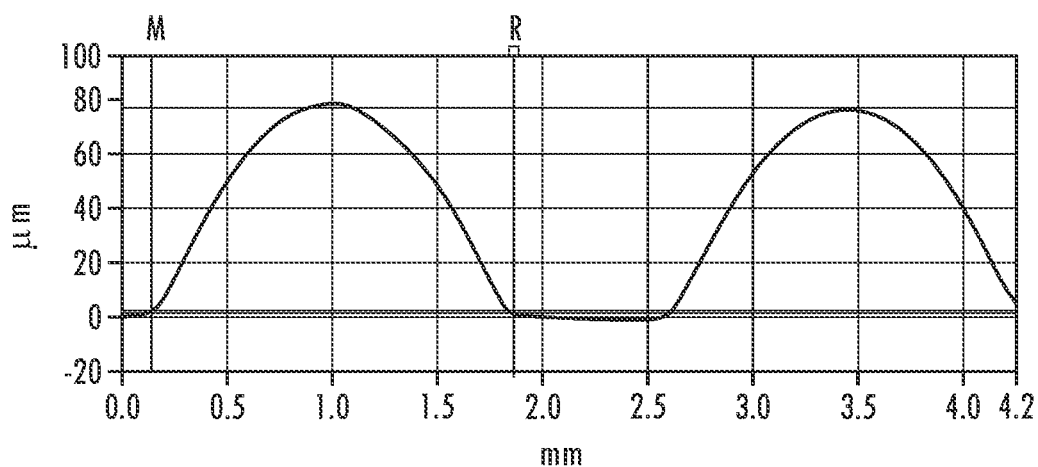
FIG. 23B shows the sectional analysis of the x and y profiles of the air blown container at location 5.
Figure 23B:
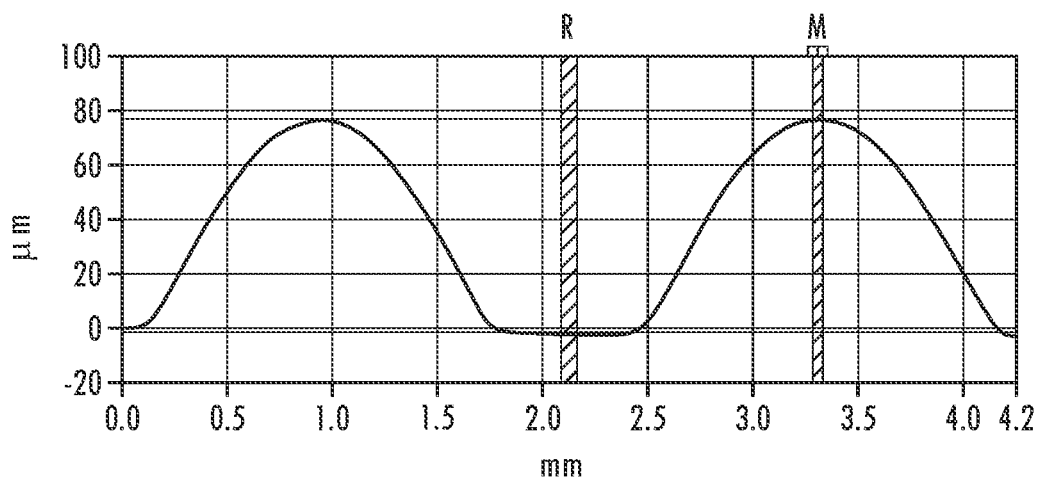
Figure 24A:
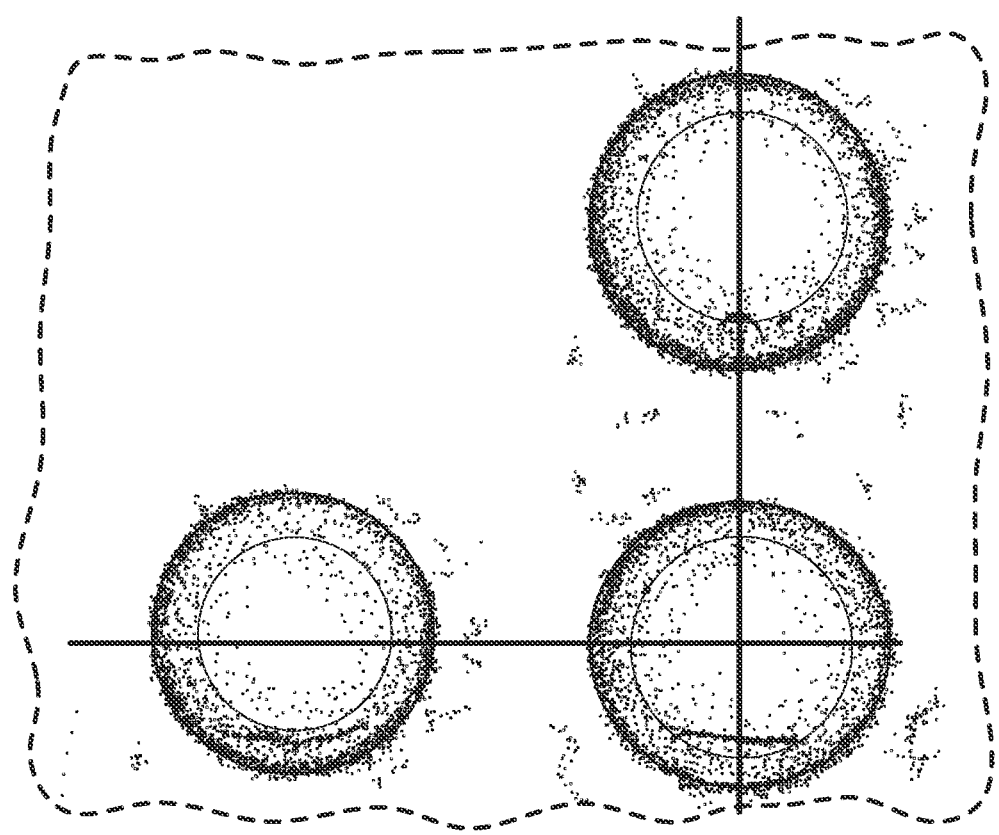
FIG. 24A is the two dimensional (2D) image of the liquid blown container at location 5 and shows the locations of x and y profiles for sectional analysis.
Figure 24B:
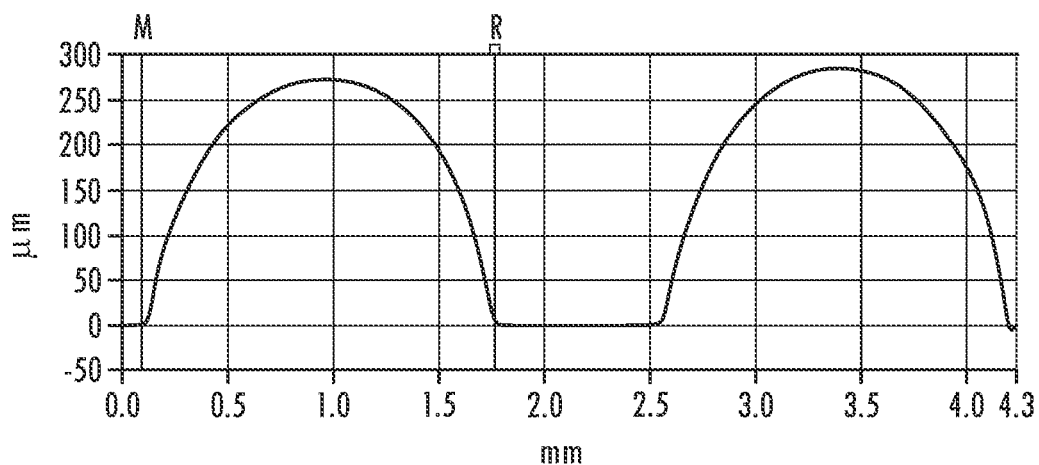
FIG. 24B shows the sectional analysis of the x and y profiles of the liquid blown container at location 5.
Figure 24B:
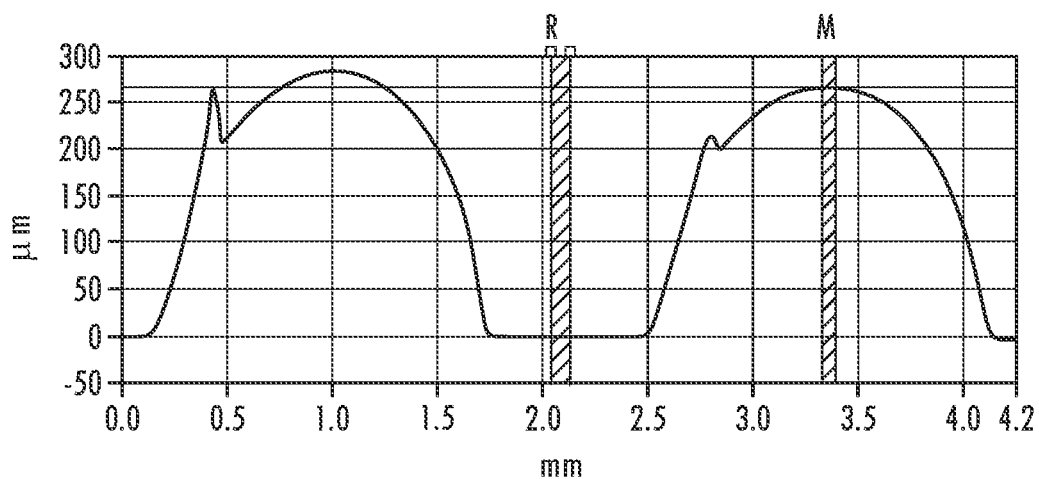
Figure 25A:
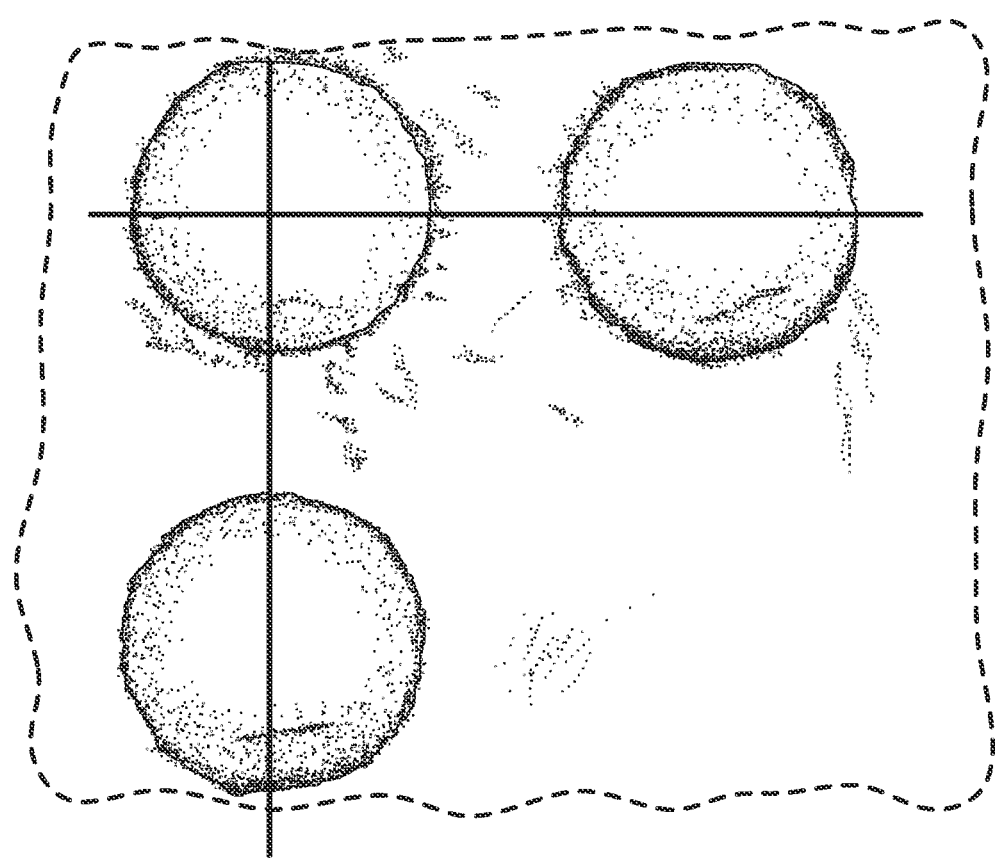
FIG. 25A is the two dimensional (2D) image of the air blown container at location 6 and shows the locations of x and y profiles for sectional analysis.
Figure 25B:
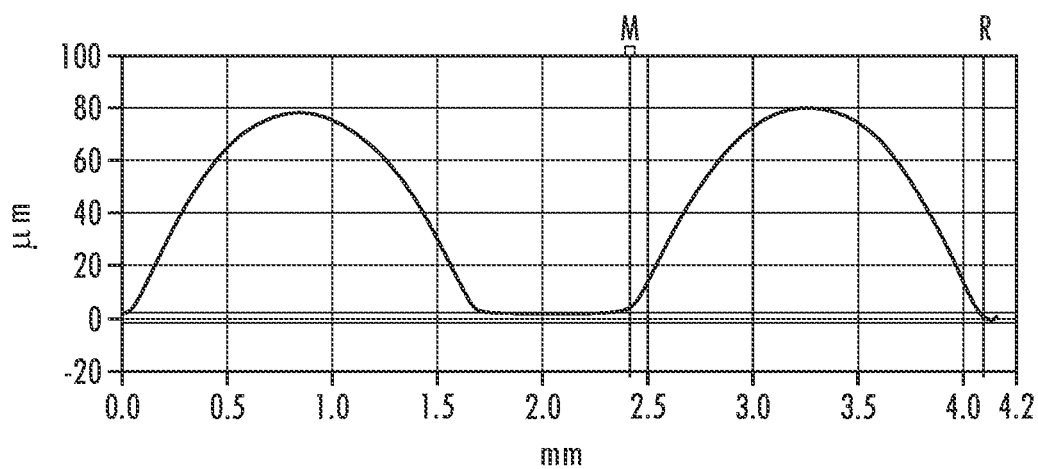
FIG. 25B shows the sectional analysis of the x and y profiles of the air blown container at location 6.
Figure 25B:
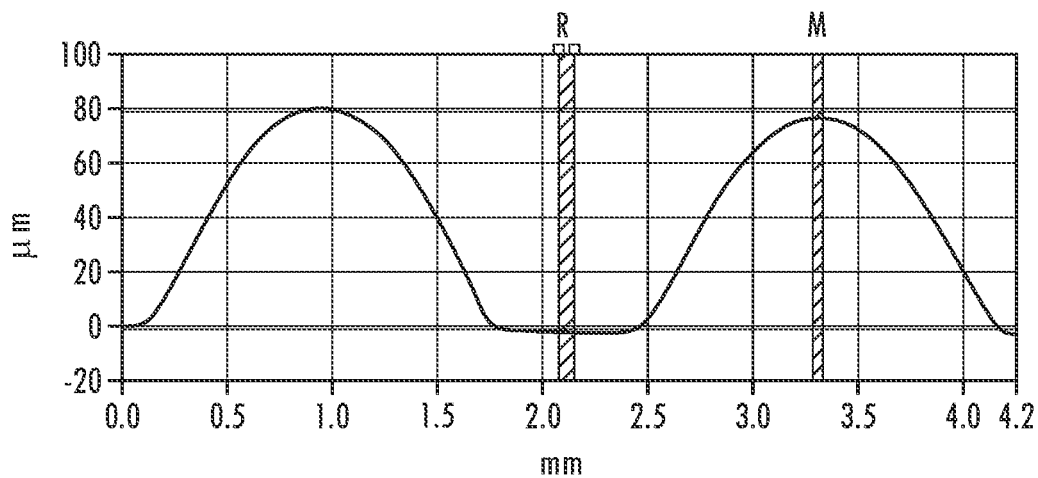
Figure 26A:
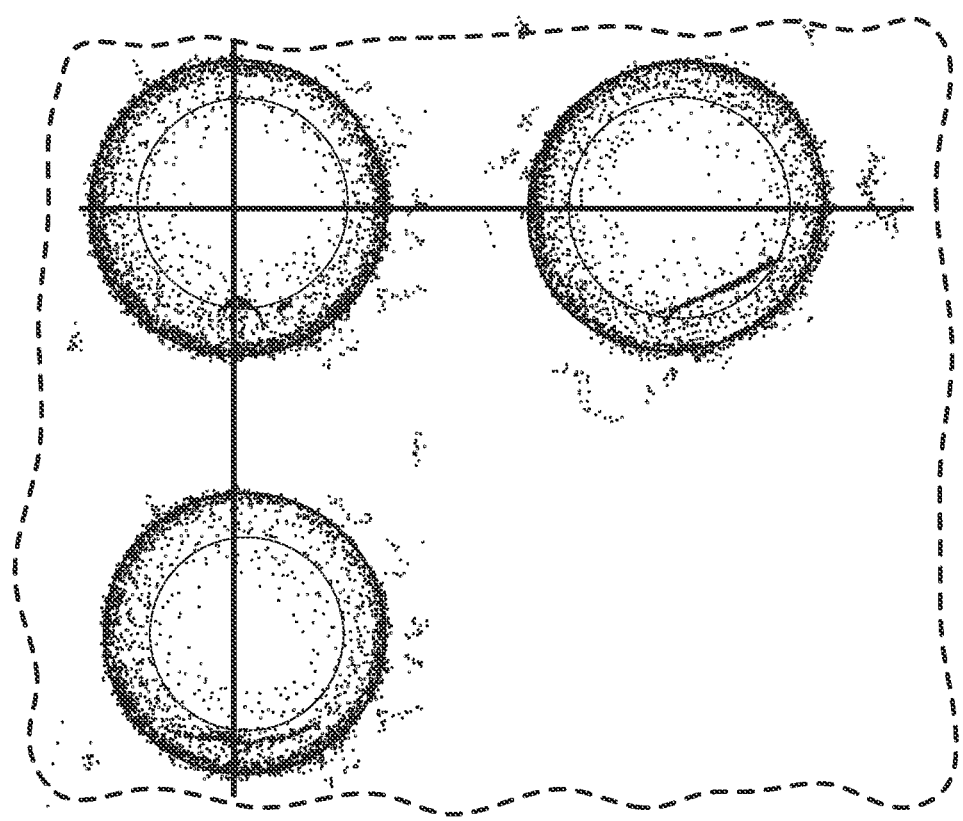
FIG. 26A is the two dimensional (2D) image of the liquid blown container at location 6 and shows the locations of x and y profiles for sectional analysis.
Figure 26B:
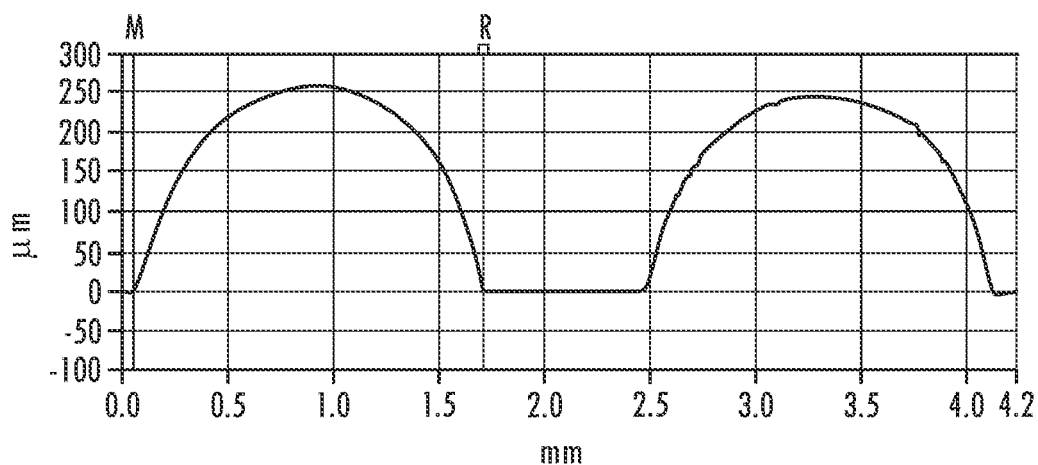
FIG. 26B shows the sectional analysis of the x and y profiles of the liquid blown container at location 6.
Figure 26B:
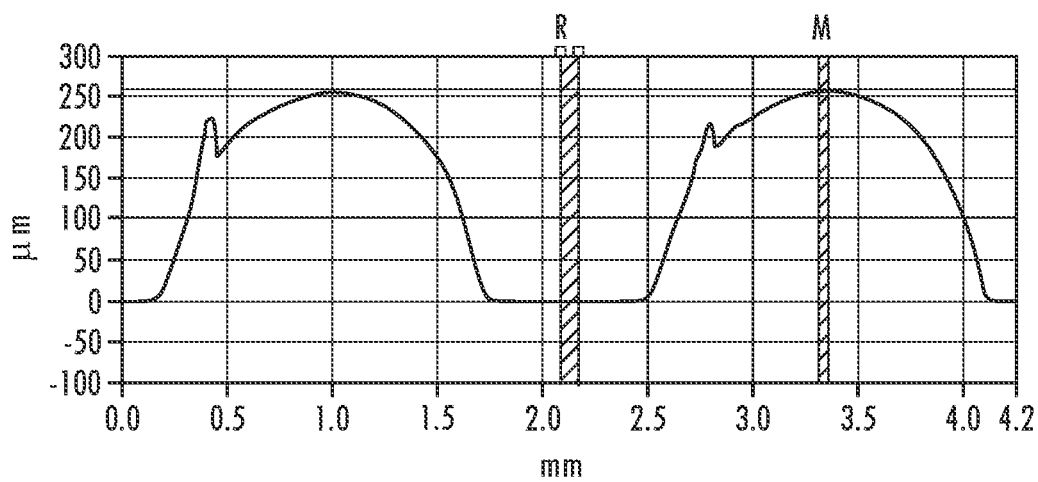

As noted above, the mold 22 used in forming the samples was provided with various engravings to simulate a wide variety of different embossments on a resultant container 1. The six locations where the OP images were take are identified in FIG. 8 at boxes 1-6. Locations 1-3 were provided in the sidewall 64 of the container 1, while locations 4-6 were provided in the shoulder 62. Location 1 was provided with a surface texture pattern, etched pattern no. 800-003 (Custom Etch, Inc., New Castle, PA) and included 0.33 mm/0.013" recesses in the mold to produce a raised pattern on the container. Location 2 was provided with a surface texture pattern, etched pattern no. 800-013 (Custom Etch, Inc.) and included 0.06 mm/0.0025" recesses in the mold to produce a raised pattern on the container. Location 3 also included a surface texture pattern, etched pattern no. 800-014 (Custom Etch, Inc.) and included 0.09 mm/0.0035" recesses in the mold to produce a raised pattern on the container. Locations 4-6 included 0.75 mm/0.03" hemispherical recesses in the mold to produce, respectively, raised double, triple and triple dot patterns on the container.

The OP images were collected using a Contour GT-X8 optical profilometer (Bruker Corporation, Tucson, AZ). Image processing procedures involving tilt removal, cylinder removal, a low pass statistic filter, and data restoration were employed. In analyzing the locations 1-3, a 4.0 mm×4.0 mm area was imaged by autostitching together multiple 0.6 mm×0.4 mm images. In analyzing location 4 a 2.0 mm×4.3 mm area was imaged and in analyzing locations 5 and 6 a 4.3 mm×4.3 mm area was imaged, both also by autostitching together multiple 0.6 mm×0.4 mm images. Top (2-D) views of these areas are shown in the "A" designations of FIGS. 9-20 and perspective (3-D) views of these areas are shown in the "B" designations of FIGS. 9-20. The topography differences of these images are presented in FIGS. 9-20 (A&B), where purple or deep blue designates lowest height areas near the surface of the side wall and red designates the highest regions relative to the side wall of the container 1.

Roughness analyses were performed and are expressed as: (1) Root-Mean-Square Roughness, $S_q$; (2) Roughness Average, $S_a$; (3) Maximum Peak Height, $S_p$; (4) Maximum Valley Depth, $S_v$; (5) Maximum Height, $S_z$; (6) Roughness Skewness, $S_{sk}$; and (7) Roughness Kurtosis, $S_{ku}$. These roughness analysis parameters are defined as follows:

Mean ($Z_{avg}$): The average of all of the Z values in the imaged area;

Root-Mean-Square Roughness ($S_q$): the standard deviation of the Z values in the image. It is calculated according to the formula: $S_q = \sqrt{\{\Sigma(Z_i - Z_{avg})^2/N\}}$ where $Z_{avg}$ is the average Z value within the image; $Z_i$ is the current value of Z; and N is the number of points in the image;

Roughness Average ($S_a$): the mean value of the surface relative to the center plane and is calculated using the formula: $S_a = (1/N)\Sigma|Z_i|$;

Maximum Peak Height ($S_p$): the tallest height in the profile, relative to the mean plane;

Maximum Valley Depth ($S_v$): the lowest height in the profile, relative to the mean plane;

Maximum Height of the Profile ($S_z$): the difference in height between the highest and lowest points of the surface, relative to the mean plane. $S_z = S_p - S_v$;

Roughness Skewness ($S_{sk}$): a measure of the asymmetry of the probability distribution of the Z values. $S_{sk} = [1/(NS_q^3)]\Sigma(Z_i^3)$;

Roughness Kurtosis ($S_{ku}$): a measure of the peakedness of the probability distribution of the Z values. $S_{ku}[1/(NS_q^4)]\Sigma(Z_i^4)$;

Fastest Decay Autocorrelation Function ($S_{al}$): This optional spatial parameter is defined as the length of the fastest decay of the 20% of the autocorrelation function, in any direction. A high value for $S_{al}$ indicates the surface is dominated by low frequency components;

Texture Direction of Surface ($S_{td}$): This optional spatial parameter is the angle of the dominant lay of the surface, relative to the Y axis. This parameter is determined from the Angular Power Spectral Density Function; and The results of the roughness analyses are presented below in Table 3. As noted above, the images of the analyzed locations from the Air Blown bottle are provided in FIGS. 9, 11, 13, 15, 17, and 19, while the images of the analyzed locations from the Liquid Blown bottle are provided in FIGS. 10, 12, 14, 16, 18 and 20. As summarized and shown in Table 3 by the consistently higher values, the analyzed locations on the Liquid Blown bottle were consistently rougher than the analogous locations on the Air Blown bottle, and therefore better formed surface texture.

TABLE 3

Roughness Results-Height Parameters

| Sample ID | Location | $S_a$ (μm) | $S_q$ (μm) | $S_p$ (μm) | $S_v$ (μm) | $S_z$ (μm) | $S_{sk}$ | $S_{ku}$ |
|---|---|---|---|---|---|---|---|---|
| Air Blown | 1 | 12.14 | 14.11 | 36.04 | −52.87 | 88.91 | 0.48 | 2.54 |
| | 2 | 4.52 | 5.93 | 17.45 | −39.48 | 56.93 | −0.68 | 4.62 |
| | 3 | 6.96 | 8.91 | 27.39 | −41.66 | 69.05 | −0.11 | 3.55 |
| | 4 | 20.72 | 24.80 | 62.11 | −24.36 | 86.47 | 0.99 | 2.50 |
| | 5 | 15.23 | 21.20 | 68.18 | −28.90 | 97.08 | 1.59 | 4.27 |
| | 6 | 17.01 | 21.69 | 74.64 | −33.18 | 107.82 | 1.51 | 4.03 |
| Liquid Blown | 1 | 26.00 | 28.01 | 47.73 | −75.18 | 122.91 | 0.00 | 1.49 |
| | 2 | 10.96 | 12.91 | 32.46 | −48.20 | 80.66 | −0.30 | 2.37 |
| | 3 | 11.65 | 13.78 | 62.48 | −54.97 | 117.45 | −0.49 | 2.60 |
| | 4 | 85.89 | 99.58 | 210.66 | −98.03 | 308.69 | 0.70 | 1.85 |
| | 5 | 62.47 | 84.10 | 222.02 | −124.99 | 347.01 | 1.16 | 3.07 |
| | 6 | 68.02 | 80.78 | 207.58 | −120.85 | 328.43 | 1.11 | 2.77 |

Texture Aspect Ratio ($S_{tr}$): This optional spatial parameter is defined as the ratio of the fastest decay to the slowest decay to correlation 20% of the autocorrelation function. $S_{tr}$ will be closer to 0 for surfaces with a strong lay; $S_{tr}$ will be closer to 1 for surfaces having a uniform texture.

Regarding the roughness analysis, it is noted that the data was acquired using a 20× objective. When analyzed with a 5× objective, The rough surfaces resulted in significant missing data when analyzed with the 5× objective because that objective has a more limited angular acceptance. A 20× objective provided better data quality, but required stitching together about 100 images instead of 6 images and analysis times were considerably longer than initially expected.

The estimated uncertainties of the roughness values provided are within ±3% (at an approximate level of confidence of 95% using a coverage factor of k=2). Roughness data below 6 nm should be viewed as "semi-quantitative" unless a separate z-height calibration in this range is performed. "Semi-quantitative" data still allows for comparisons between samples as the precision of the measurement is about ±10%. (The uncertainty of the absolute roughness values however is not determined.) It is also noted that the uncertainty estimates provided assume that there is no variability in roughness between different locations sampled.

The Contour GT-X8 acquires 3-dimensional height information from a surface and stores the data in a digital format. The instrument software can use this height information to perform a variety of statistical analyses from the entire imaged area (e.g. $S_q$, $S_a$, $S_p$, $S_v$, and $S_z$). Additional roughness statistics, spatial statistics, and volume statistics could be calculated for the whole or for a selected portion of the image.

TABLE 4

Section Analysis Results

| Sample ID | Location | Diameter (X-Profile) (mm) | Height (Y-Profile) (μm) |
|---|---|---|---|
| Air Blow | 4 | 1.70 | 81.05 |
| | 5 | 1.72 | 78.84 |
| | 6 | 1.69 | 80.30 |
| Liquid Form | 4 | 1.67 | 273.70 |
| | 5 | 1.69 | 266.36 |
| | 6 | 1.67 | 258.95 |

Section analyses were performed to measure the dimensions of the braille dots/characters in locations 4-6. The profiles were created by measuring the height values across lateral regions (x and y positions shown in the 2-D images) of FIGS. 21-26 ("A" designations). The heights of these features were determined from the profiles by measuring the differences in z-height between the two cursors. Similarly, the lateral dimensions were determined by measuring the differences x- or y-position. The green and red cursors indicate the measurement and reference locations, respectively. The widths ("ΔX") and heights ("ΔZ") are listed above the graphs. The heights and diameters of the braille dots, as measured by the above section analysis, are summarized in Table 4. As seen therein, the Liquid Blown container had much taller dots, which is consistent with the Liquid Blown container having higher $S_z$ values, as seen in Table 3.

As noted above, in locations 4, 5 and 6, the braille dots were formed by providing 0.75 mm hemispherical depressions in the mold at the relative locations. The average height utilizing the air blow process for the braille dots was therefore 80.06 μm. For the braille dots formed by the liquid blow process, the average height was 266.34 μm. As seen from these averages, even while utilizing a lower peak pressure, 35 bar versus 40 bar, the resulting liquid blown container provided braille dots that were, on average, 3.3 times greater in height than the air blown container.

Relative to the depression provided in the mold for forming the braille dots, the ratio of the depth of the depression to the height of the resulting braille dot was over 9:1 for the for the air blown container and less than 3:1 for the liquid blown container. Extrapolating these results, the depression in the mold would have to be at least 3 times as deep in order to form a braille dot feature of similarly height using air as the blowing medium. Notably, the resulting width of the feature would negate its use in the braille tactile writing system.

A relief factor ($R_f$) can also be defined for the resultant braille dot features by the formula $R_f=H_r/H_m$, where $H_r$ is the height of the feature and $H_m$ is the depth of the relief in mold used to form the feature. In the air blown container, the relief factor Rf=0.11; and in the liquid blown container the relief factor Rf=0.35.

As a person skilled in the art will really appreciate, the above description is meant as an illustration of at least one implementation of the principles of the present invention. This description is not intended to limit the scope or application of this invention since the invention is susceptible to modification, variation and change without departing from the spirit of this invention, as defined in the following claims.

We claim:

1. A molded container of plastic material, the molded container comprising:
    a finish defining an opening into the molded container;
    a body extending from the finish and including a shoulder adjacent the finish, a base defining a closed end of the container, and a sidewall extending between the shoulder and the base; and
    a series of raised dots defining tactile writing feature formed on a surface of the container and being defined by the plastic material forming the container, the series of raised dots defining an embossed texture having a roughness average $S_a$ greater than or equal to 62.47 μm.

2. The container according to claim 1, wherein the tactile writing feature is formed on at least one of the shoulder and the base.

3. The container according to claim 1, wherein the tactile writing feature is formed adjacent to the sidewall on at least one of the shoulder and the base.

4. The container according to claim 1, wherein each of the raised dots extends from an immediately surrounding surface of the molded container to a nominal height of not less than 0.2 mm.

5. The container according to claim 1, wherein each of the raised dots extends from an immediately surrounding surface of the molded container to a nominal height of not less than 0.25 mm.

6. The container according to claim 1, wherein each of the raised dots extends from an immediately surrounding surface of the molded container to a nominal height of not less than 0.258 mm.

7. The container according to claim 1, wherein each of the raised dots extends from an immediately surrounding surface of the molded container to a nominal height of between 0.25 mm and 0.6 mm.

8. The container according to claim 1, wherein each of the raised dots has a nominal base diameter of not more than 1.69 mm.

9. The container according to claim 1, wherein each of the raised dots has a nominal base diameter in the range of greater than 1.4 mm to less than 1.7 mm.

10. The container according to claim 9, wherein each of the raised dots extends from an immediately surrounding surface of the molded container to a nominal height in the range of 0.25 mm to less than 0.9 mm.

11. The container according to claim 1, wherein each of the raised dots extends from an immediately surrounding surface of the molded container to a nominal height in the range of 0.25 mm to less than 0.9 mm.

12. The container according to claim 1, wherein the tactile writing feature is comprised of a plurality of equidistantly spaced cells and each cell including a character formed by not more than six of the raised dots.

\* \* \* \* \*